US010891687B2

(12) United States Patent
Bernstein et al.

(10) Patent No.: US 10,891,687 B2
(45) Date of Patent: *Jan. 12, 2021

(54) COMPUTER IMPLEMENTED SYSTEM AND METHOD FOR A RENT-TO-OWN PROGRAM

(71) Applicant: FlexShopper, Inc., Boca Raton, FL (US)

(72) Inventors: Brad Bernstein, Boca Raton, FL (US); Justin Metzl, Boca Raton, FL (US); Andres Galindo, Delray Beach, FL (US)

(73) Assignee: FlexShopper, Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,593

(22) Filed: Sep. 11, 2018

(65) Prior Publication Data

US 2019/0012731 A1 Jan. 10, 2019

Related U.S. Application Data

(63) Continuation of application No. 14/293,751, filed on Jun. 2, 2014, now Pat. No. 10,089,682.

(Continued)

(51) Int. Cl.
*G06Q 30/06* (2012.01)

(52) U.S. Cl.
CPC .............................. *G06Q 30/0645* (2013.01)

(58) Field of Classification Search
None
See application file for complete search history.

(56) References Cited

U.S. PATENT DOCUMENTS

| 5,825,883 A | 10/1998 | Archibald et al. |
| 6,947,907 B1 | 9/2005 | Silverman |

(Continued)

FOREIGN PATENT DOCUMENTS

| EP | 1835375 | 9/2007 |
| JP | 2002133330 | 5/2002 |

(Continued)

OTHER PUBLICATIONS

Anderson, Michael H. et al. "Rent-To-Own Agreements: Customer Characteristics and Contract Outcomes," Journal of Economics and Business, 61, No. 1 (2009), pp. 51-69.

(Continued)

*Primary Examiner* — Dennis W Ruhl
(74) *Attorney, Agent, or Firm* — Dinsmore & Shohl LLP

(57) ABSTRACT

A system including an e-commerce server configured to communicate with a rent-to-own (RTO) management application and a consumer device is disclosed. The e-commerce server includes: i) an e-commerce application configured to provide an e-commerce website to the consumer device, the e-commerce web site having a plurality of e-commerce user interfaces including a checkout interface, and ii) a RTO plug-in integrated with the e-commerce application to facilitate a RTO transaction through the e-commerce website. The RTO plug-in is executable by the e-commerce server to: i) integrate a RTO control element in the checkout interface, wherein the RTO control element is selectable to initiate the RTO transaction as a payment option for a good, and ii) after selection of the RTO control element, provide to the consumer device one or more than one RTO user interface received from the RTO management application, to facilitate completion of the RTO transaction through the e-commerce website.

20 Claims, 40 Drawing Sheets

Related U.S. Application Data

(60) Provisional application No. 61/923,890, filed on Jan. 6, 2014, provisional application No. 61/829,489, filed on May 31, 2013.

(56) References Cited

U.S. PATENT DOCUMENTS

| | | |
|---|---|---|
| 7,860,764 B1 | 12/2010 | Alexander et al. |
| 8,423,548 B1 | 4/2013 | Trandal |
| 10,089,682 B1 | 10/2018 | Bernstein et al. |
| 2002/0007295 A1 | 1/2002 | Eguchi et al. |
| 2005/0144119 A1 | 6/2005 | Monsen et al. |
| 2005/0251474 A1 | 11/2005 | Shinn et al. |
| 2007/0088643 A1 | 4/2007 | Doi |
| 2008/0093460 A1 | 4/2008 | Franz |
| 2008/0201257 A1 | 8/2008 | Lewis et al. |
| 2009/0055260 A1 | 2/2009 | Ensign |
| 2009/0234722 A1 | 9/2009 | Evevsky |
| 2009/0327031 A1 | 12/2009 | Jain |
| 2010/0138259 A1 | 6/2010 | Delk |
| 2011/0295708 A1 | 2/2011 | Shin |
| 2011/0078074 A1 | 3/2011 | Lipman |
| 2011/0295705 A1 | 12/2011 | Kasmei |
| 2012/0223137 A1 | 9/2012 | Heeter |
| 2013/0024323 A1 | 1/2013 | Tomassen |
| 2013/0030985 A1 | 1/2013 | Shebesta |
| 2019/0012731 A1 | 1/2019 | Bernstein et al. |

FOREIGN PATENT DOCUMENTS

| | | |
|---|---|---|
| WO | 2004086179 | 10/2004 |
| WO | 2008101103 | 8/2008 |
| WO | 2013130207 | 9/2013 |

OTHER PUBLICATIONS

Joshi, Manish, et al. "Matchmaking in p2p E-Marketplaces: Soft Contraints and Compromise Matching," In Proceedings of the 12th International Conference on Electronic Commerce: Roadmap for the Future of Electronic Business, pp. 134-140, AMC, 2010.

Dalik, Tanya. "The Best Joomla! eCommerce Plugins." Cart2Cart Shopping Cart Migration, Mar. 12, 2013. https://www.shopping-cart-migration.com/blog/61-must-know-tips/8480-the-best-joomla-ecommerce-plugins. Accessed Nov. 12, 2017.

"Rent-A-Center Selects Netscreen to Secure Transactions." ProQuest. Worldwide Videotex, Jan. 1, 2003. https://www.search.proquest.com/printviewfile?accountid=14753. Accessed Jan. 6, 2017.

Rent-A-Center Home Page. Rent-A-Center, 2003. http://wen.archive.org/web/20030718232022/http://rentacenter.com/. Accessed Jan. 6, 2017.

"Shift4 Releases New Technology to Insure the Security of Its Merchants' and Partners' Payment Processing." ((Hotel Online, Special Report)), Oct. 5, 2005, https://www.hotel-online.com/New/PR2005_4th/Oct05_Shift4.html. Accessed Jan. 8, 2017.

~1500

FlexShopper
Lease the brands you love

① Apply for account   ② Verify your bank account

Hurry, Limited time only! Get your first weekly payment FREE** with an approved FlexShopper spending limit.

New Customer
Apply for a spending limit below

First Name:        Last Name:

Email Address:

Confirm Email Address:

Protect your information
Password:

Re-enter Password:

Already an existing customer?
( Log in )

Qualify today for
up to $2500
Instant spending limit!

Limited time only!
First Weekly Payment FREE**

⊘ No credit necessary
⊘ No upfront payments
⊘ No long-term commitment
⊘ No hidden fees Approval Requirements
- Earn at least $1,000 per month
- A bank account or debit card for at least 60 days
- Up to 3 NSF's ☑ Sign me up to receive the latest news on FlexShopper products and promotions. We respect your privacy. Please view our Privacy Policy ( Continue )

Mobile App Services Agreement   Website Services Agreement   Privacy Policy
Copyright @ 2014 FlexShopper, LLC. All Rights reserved.

** You will be given a credit for your first weekly payment as described in your Lease agreement. As other terms and conditions of your Agreement remains in effect. This credit is only valid for online orders and for a single lease per individual.

FlexShopper
Lease the brands you love

① Apply for account  ② Verify your bank account

Hurry, Limited time only! Get your first weekly payment FREE** with an approved FlexShopper spending limit.

Enter your home address
Please use the billing address that appears on your bank statement.
Incomplete or incorrect information may result in a delay or cancellation.

Address Line 1:

Address Line 2:

City:

State:

Zip Code:

Home Phone:

Mobile Phone:

Qualify today for
up to $2500
Instant spending limit!

Limited time only!
First Weekly Payment FREE**

- No credit necessary
- No upfront payments
- No long-term commitment
- No hidden fees Approval Requirements
- Earn at least $1,000 per month
- A bank account or debit card for at least 60 days
- Up to 3 NSF's Please provide additional information Social Security Number:
Confirm Social Security Number:

Gender (Optional): ○ Female  ○ Male
Date of birth:

Must be at least 18 years old.

☐ By checking here and clicking "Continue" you affirm that the information given in connection with this application is true and accurate. Additionally, you acknowledge that you have had the opportunity to read, understand and consent to our ☐ By checking here and clicking "Continue" you consent to our obtaining information about your from consumer reporting agencies and other sources as part of our processing you application.

☐ By checking here and clicking "Continue", you authorize FlexShopper LLC. its affiliates and agents to send you artificial or prerecorded messages or text messages to the wireless number listed below using an automated dialing device. The calls or text messages will provide you information regarding products and promotions. You do not need to consent to receive calls and text messages in order to be eligible to apply for and receive products or services form FlexShopper. Standard message and data rates may apply. Wireless number xxx-xxx-xxxx.

FlexShopper
Lease the brands you love

① Apply for account  ② Verify your bank account

Hurry, Limited time only! Get your first weekly payment FREE*** with an approved FlexShopper spending limit.

Verify your bank account
We will get an electronic read-only copy of your bank or debit card statement instantly right here online.

- It will allow us to make a faster lease decision for you!
- No need to print, fax or email documents.
- Plus, your login credentials and financial data are protected according to bank industry security specifications.
- What you'll need: your bank login and account information.

Bank information
Please choose and enter your account information below. Payments will be made via your Bank Account or Debit Card.

○ Debit Card  ○ Bank Account

Please use your primary account with payroll deposits to quickly verify your income and qualify for up to $2,500 in spending limit.

Debit Card Number: [____]  Expiration Date: Month [__] Year [__]

Approval Requirements
Earn at least $1,000 per month
A bank account or debit card for at least 60 days
Up to 3 NSF's Clicking "Continue", you will be taken to the web site of a national consumer risk institution, which will instantly and securely provide us with a read-only copy of your most recent bank statement (or comparable information about any prepaid payroll card you use). This action will also serve as your authorization for this institution to advise us of your account balance from time to time, including after a payment we have initiated has been dishonored and before we seek re-initiate the payment. This could save you bank charges for dishonored items.

○ Debit Card  ○ Bank Account

Please use your primary account with payroll deposits to quickly verify your income and qualify for up to $2,500 in spending limit.

Routing Number [____]  Account Number [____]

Approval Requirements
Earn at least $1,000 per month
A bank account or debit card for at least 60 days
Up to 3 NSF's

FIG. 18

FlexShopper
Lease the brands you love

① Apply for account  ② Verify your bank account

Almost done!

In order to calculate your spending limit, our computer system takes a quick look at your banking history to verify income.

Remember:
· We DO NOT run your credit report.
· We are completely safe and secure.
· Your bank username & password are not stored ANYWHERE.
· There is no credit necessary.

Please make sure to use the bank account or prepaid debit card where you have your paychecks deposited.

This application is for:
Fill in the missing information

English   En Espanol

First Name:
[John]

Last Name
[Doe]

Bank or Card Name
[ ]

Account Type
[Other]

When do you receive your paycheck?
[Other]

Amount of each paycheck
[ ]

I have read and accept these Terms and Conditions   [Next]

Verify
We will
· It will
· No nee
· Plus, y
· What y

Bank i
Please

○ Deb
Please
verify
Debit

Clicking
securely
prepaid p
account
seek re- (Continue)

FIG. 19

```
                                                              ┌─1500
┌──────────────────────────────────────────────────────────────────┐
│ FlexShopper         ①Apply for account  ②Verify your bank account│
│ Lease the brands you love                                        │
├──┬───────────────────┬───────────────────────────────────────┬───┤
│Hu│ Almost done!      │ Login Information                     │it │
│Ve│                   │ Enter your online user ID and Password for the account below.
│rify│ In order to calculate your                              │   │
│We will│ spending limit, our                                  │   │
│  │ computer system takes a            English    En Espanol  │   │
│  │ quick look at your banking                                │   │
│  │ history to verify income. Name: CC Bank                   │   │
│  │                           Account: 30569309025904         │   │
│  │ Remember:                                                 │   │
│Bank i│ · We DO NOT run your   Banking User ID                │   │
│Please│ credit report.         ┌──────────────┐   ┌──────┐    │Card.│
│  │ · We are completely safe   │              │   │ show │    │   │
│○Deb│ and secure.             Banking Password             │   │
│Please│ · Your bank username & ┌──────────────┐   ┌──────┐    │   │
│verify│ password are not stored│              │   │ show │    │onth│
│  │ ANYWHERE.                                   ┌──────┐     │rd for│
│Debit │ · There is no credit                    │SUBMIT│     │   │
│  │ necessary.                                  └──────┘     │   │
│Clicking│                    Additional screens may be presented. Be accurate.│and│
│securely│ Please make sure to use  For your security, only three attempts are allowed.│any│
│prepaid p│ the bank account or prepaid                        │your│
│account  │ debit card where you have                           │we │
│seek re- │ your paychecks deposited.                           │   │
│(Continue)│                                                    │   │
└──────────────────────────────────────────────────────────╲───────┘
                           FIG. 20                         1514
```

FlexShopper
Lease the brands you love

① Apply for account  ② Verify your bank account

Almost done!

In order to calculate your spending limit, our computer system takes a quick look at your banking history to verify income.

Remember:
· We DO NOT run your credit report.
· We are completely safe and secure.
· Your bank username & password are not stored ANYWHERE.
· There is no credit necessary.

Please make sure to use the bank account or prepaid debit card where you have your paychecks deposited.

Account Confirmation
Multiple accounts located

English  En Espanol

Select the account to be verified.
⊙ My Checking (1000001111)
○ My Roth IRA (2000004444)
○ My Mortgage (1000000001)
○ My DC (2000005555)
○ My Line of Credit (8000006666)
○ My Brokerage (0000000000)
○ My Auto Loan (8000008888)
○ My Retirement (0000000001)
○ My Visa (4100007777)
○ My Savings (1000002222)

[Submit]

FlexShopper
Lease the brands you love

① Apply for account   ② Verify your bank account

Hurry, Limited time only! Get your first weekly payment FREE℠ with an approved FlexShopper spending limit.

Sorry, you didn't qualify for a spending limit.

FlexShopper
Lease the brands you love

① Apply for account   ② Verify your bank account

Hurry, Limited time only! Get your first weekly payment FREE℠ with an approved FlexShopper spending limit.

Almost done...
Your application is currently pending review. A FlexShopper agent will call you shortly.

FlexShopper
Lease the brands you love

① Apply for account  ② Verify your bank account

Hurry, Limited time only! Get your first weekly payment FREE** with an approved FlexShopper spending limit.

---

Review your lease

FLEXSHOPPER, LLC FLORIDA RENTAL-PURCHASE AGREEMENT/LEASE    2708

THIS AGREEMENT/LEASE CONTAINS AN ARBITRATION PROVISION (SEE ¶ 18) UNLESS YOU PROMPTLY REJECT THE ARBITRATION PROVISION, THE ARBITRATION PROVISION WILL HAVE A SUBSTANTIAL EFFECT ON YOU RIGHTS IN THE EVENT OF A DISPUTE, INCLUDING YOUR RIGHT TO BRING OR PARTICIPATE IN A CLASS PROCEEDING.

| Lessor/Owner: | Lessee(s) Potential |
|---|---|
| FlexShopper, LLC | Purchaser(s) |
| 2650 North Military Trail, Suite 230 | John Doe |
| Boca Raton, FL 33431 | 123 address |
| 855-353-9289 | Boca Raton, FL 33431 |
| Help@FlexShopper.com | |
| www.FlexShopper.com | |

In this Rental Purchase Agreement/Lease ("Lease"), "you" and "your" mean the person(s) signing this Lease as Lessee/ Potential Purchaser, and "we", "our" and "us" mean the Lessor/Owner identified above and its successors and assigns.

1. Rental Property: Your are renting [(1) New - UN50EH5300FXZA-SAM-FLX- Samsung-Samsung UN50EH5300-50" LED-backlit LCD TV] the items described on Exhibit a hereto (the "Property"). The Property is new and has not been rented. The Cash Price of the Property is $907.35. If there are multiple Property items, the Cash Price of each item is set forth on Exhibit A. The Cash Price is the amount we would charge for a cash ale of the Property. The Cash Price does not include applicable sales/use taxes.

2. Lease Terms Payments Purchase Rights: The initial term of this Lease commences when the Lease is signed and ends on the Friday your 12th weekly payment is due (excluding the payment due on the date of this Lease. Unless this Lease ends in accordance with ¶ 6 it will automatically renew at the end of of then-current term for an additional term of 12 weeks or if earlier the period when your final

---

☑ BY CHECKING HERE, AND CLICKING "COMPLETE YOUR LEASE & ORDER", YOUR AGREE TO ALL OF THE TERMS OF THE LEASE, INCLUDING THE PAYMENT AUTHORIZATION (¶17), ARBITRATION PROVISION (¶18) AND CONSENT TO RECEIPT OF ELECTRONIC COMMUNICATIONS (¶19).

2706

( Complete your lease & order )

Please read & scroll to bottom of your lease and check the box above before clicking "Complete your lease & order".

FIG. 28

FlexShopper
Lease the brands you love

① Apply for account  ② Verify your bank account  ③ Review and place order

Congratulations, John! You're Approved!
Your FlexShopper spending limit is $1,000.00 in merchandise ($38.46)

Please have the store sales associate enter your items
Look over each item for accuracy and information one more time before clicking "submit items".

| # | Condition | Sku# | Brand | Product Description | Qty | Price | |
|---|---|---|---|---|---|---|---|
| 1 | New ▽ | C7102826 | Acer | Aspire 11.6 Chrom | 1 | 229.99 | ✕ |
| 2 | New ▽ | | | | | | ✕ |
| 3 | New ▽ | | | | | | ✕ |

3004

Est. Delivery Date: [          ]
Delivery Cost: 20.00

Order Summary
Total merchandise: $249.99
   Includes delivery.
FlexShopper Way
Weekly Payment   $9.62

Account Info
Balance Used      $0.00
Available Spend   $1,000.00
                  $38.46 per week
Spending Limit    $1,000.00

( Add more items )

( Submit Items )

This is your estimated weekly payment if you used your entire spending limit and wished to acquire ownership after making 52 weekly payments. The actual weekly payment may vary depending on how much spending limit you use and will be in your Lease. Ownership is optional and you may purchase or return the merchandise at any time after the initial payment has been paid and the minimum lease period has been met. See your lease for more information regarding ownership and minimum term.

FlexShopper
Lease the brands you love

① Apply for account    ② Verify your bank account    ③ Review and place order

Hurry, Limited time only! Get your first weekly payment FREE** with an approved FlexShopper spending limit.

Congratulations, John! You're Approved!
Your FlexShopper spending limit is $3,000.00 in merchandise ($116.54)

Review your order
Look over your order and information one more time before reviewing your lease.

( Review your lease )

---

Home Address

John Doe
2650 Military Trail, Suite 230
Boca raton, Florida 33431
561-948-0765
john.doe@flexshopper.com At this time, we can only ship to the home billing address on your application.

---

Estimated delivery: August 8, 2013

Cannon Power Shot SX500 IS 16.00 MP Digital Camera with 30x Wide-Angle Optical image stabilized Zoom and 3.0 Inch LCD (Black)

Quantity: 1

Google Nexus 7 FHD Tablet )7-Inch, 32GB, Black) by ASUS

Quantity: 1

( Add new Items )

| Order Summary | |
|---|---|
| Total merchandise: | $249.99 |
| | Includes delivery. |
| FlexShopper Way | |
| Weekly Payment | $9.62 |

| Account Info | |
|---|---|
| Balance Used | $0.00 |
| Available Spend | $1,000.00 |
| | $38.46 per week |
| Spending Limit | $1,000.00 |

( Review your lease )

Review your order
Look over your order and information one more time before reviewing your lease.

Review your lease

FLEXSHOPPER, LLC FLORIDA RENTAL-PURCHASE AGREEMENT/LEASE

THIS AGREEMENT/LEASE CONTAINS AN ARBITRATION PROVISION (SEE ¶ 18) UNLESS YOU PROMPTLY REJECT THE ARBITRATION PROVISION, THE ARBITRATION PROVISION WILL HAVE A SUBSTANTIAL EFFECT ON YOU RIGHTS IN THE EVENT OF A DISPUTE, INCLUDING YOUR RIGHT TO BRING OR PARTICIPATE IN A CLASS PROCEEDING.

| | |
|---|---|
| Lessor/Owner: | Lessee(s) Potential |
| FlexShopper, LLC | Purchaser(s) |
| 2650 North Military Trail, Suite 230 | John Doe |
| Boca Raton, FL 33431 | 123 address |
| 855-353-9289 | Boca Raton, FL 33431 |
| Help@FlexShopper.com | |
| www.FlexShopper.com | |

In this Rental Purchase Agreement/Lease ("Lease"), "you" and "your" mean the person(s) signing this Lease as Lessee/ Potential Purchaser, and "we", "our" and "us" mean the Lessor/Owner identified above and its successors and assigns.

1. Rental Property: Your are renting [(1) New - UN50EH5300FXZA-SAM-FLX- Samsung-Samsung UN50EH5300-50" LED-backlit LCD TV] the items described on Exhibit a hereto (the "Property"). The Property is new and has not been rented. The Cash Price of the Property is $907.35. If there are multiple Property items, the Cash Price of each item is set forth on Exhibit A. The Cash Price is the amount we would charge for a cash ale of the Property. The Cash Price does not include applicable sales/use taxes.

2. Lease Terms Payments Purchase Rights: The initial term of this Lease commences when the Lease is signed and ends on the Friday your 12th weekly payment is due (excluding the payment due on the date of this Lease. Unless this Lease ends in accordance with ¶ 6 it will automatically renew at the end of of then-current term for an additional term of 12 weeks or if earlier the period when your final ☑ BY CHECKING HERE, AND CLICKING "COMPLETE YOUR LEASE & ORDER", YOUR AGREE TO ALL OF THE TERMS OF THE LEASE, INCLUDING THE PAYMENT AUTHORIZATION (¶17), ARBITRATION PROVISION (¶18) AND CONSENT TO RECEIPT OF ELECTRONIC COMMUNICATIONS (¶19).

( Complete your lease & order )

Please read & scroll to bottom of your lease and check the box above before clicking "Complete your lease & order".

Review your order
Look over your order and information one more time before reviewing your lease.

FIG. 32

FlexShopper
Lease the brands you love

① Apply for account  ② Verify your bank account  ③ Review and place order
Log out Hurry, Limited time only! Get your first weekly payment FREE™ with an approved FlexShopper spending limit.

Thank you for your order
We will send you and email confirmation shortly.

Order Number: J398902
If you need to make a change to your order please call (855) 353-9289 immediately.

Home Address

John Doe
2650 Military Trail, Suite 230
Boca raton, Florida 33431
561-948-0765
john.doe@flexshopper.com At this time, we can only ship to the home billing address on your application.

Estimated delivery: August 8, 2013

Cannon Power Shot SX500 IS 16.00 MP Digital Camera with 30x Wide-Angle Optical image stabilized Zoom and 3.0 Inch LCD (Black)

Quantity: 1

Google Nexus 7 FHD Tablet )7-Inch, 32GB, Black) by ASUS

Quantity: 1

| Order Summary | |
|---|---|
| Total merchandise: | $249.99 |
| | Includes delivery. |
| FlexShopper Way | |
| Weekly Payment | $9.62 |

| Account Info | |
|---|---|
| Balance Used | $0.00 |
| Available Spend | $750.00 |
| | $28.85 per week |
| Spending Limit | $1,000.00 |

FIG. 33

ELECTRONICS SUPERSTORE

⬅ Back to Cart

1 Address Information —— 2 Shipping & Payment —— 3 Order Review

NEED HELP? CALL 1.888.955.6000

Your shipping department, working under extremely trying weather conditions, handled the order with great care and shipped it in a timely manner. The packing, double-boxed, was superb!
- Lawrence from Camden, NJ Select Your Shipping Preferences

| ITEM# | NAME & DESCRIPTION | PRICE | QUANTITY | TOTAL |
|---|---|---|---|---|
| 054D3100 | Nikon D3100 Kit<br>14.2-megapixel digital SLR camera with 18-55mm lens and HD movie mode<br>IN STOCK | ~~$499.95~~<br>Instant Rebate $70.00 off | 1 | $429.95<br>You save $70.00 |

Shipping Options: Standard Shipping - Jan 2 by 11:00 PM (FREE) ▽

Merchandise SubTotal   $429.95
Shipping   FREE
Order Total   $429.95

Alternate Payment Sources

I have a Special Offer Code, a Gift Card or a Rewards Card

I have a Friend Referral Code

Enter Your Payment Information

Please select a payment option below

- ○ VISA AMEX DISC
- ○ VMB
- ○ PPAL
- ● Flex Shopper
- ○
- ○ FINANCIAL
- ○ WESTERN UNION

FlexShopper

· No credit required  · Instant spending limit  · Affordable weekly payments

Your Estimated Payment $17.00 per week

To checkout with FlexShopper continue to place your order, you will be temporarily redirected to the FlexShopper site to log in and finalize your payment.

You'll then be returned to ElectronicsSuperstore.com for your order confirmation.

Learn More

FlexShopper

Congratulations, John! You're Approved!
Your FlexShopper spending limit is $3,000.00 in merchandise ($116.54)

Review your order
Look over your order and information one more time before reviewing your lease.

( Review your lease )

---

Home Address

John Doe
2650 North Military Trail, Suite 230
Boca Raton, FL 33431
561-949-0785
john.doe@flexshopper.com

Shipping Address

John Doe
2650 North Military Trail, Suite 230
Boca Raton, FL 33431

| Order Summary | |
|---|---|
| Total merchandise: | $857.35 |
| FlexShopper Way | |
| Weekly Payment | $35.30 |
| Includes sales tax and shipping. | |

| Account Info | |
|---|---|
| Balance Used | $0.00 |
| Available Spend | $3,000.00 |
| | $116.54 per week |
| Spending Limit | $3,000.00 |

Estimated delivery: Jan 6, 2014

Nikon D3100 Kit - 14.2-megapixel digital SLR camera

Quantity: 1

Review your order
Look over your order and information one more time before reviewing your lease.

( Review your lease )

Cancel and return to ElectronicsSuperstore.com

This is your estimated weekly payment if you used your entire spending limit and wished to acquire ownership after making 52 weekly payments. The actual weekly payment may vary depending on how much spending limit you use and will be in your Lease. Ownership is optional and you may purchase or return the merchandise at any time after the initial payment has been paid and the minimum lease period has been met. See your lease for more information regarding ownership and minimum term.

Review your lease                                                                                    3444

FLEXSHOPPER, LLC FLORIDA RENTAL-PURCHASE AGREEMENT/LEASE

THIS AGREEMENT/LEASE CONTAINS AN ARBITRATION PROVISION (SEE ¶ 18) UNLESS YOU PROMPTLY REJECT THE ARBITRATION PROVISION, THE ARBITRATION PROVISION WILL HAVE A SUBSTANTIAL EFFECT ON YOU RIGHTS IN THE EVENT OF A DISPUTE, INCLUDING YOUR RIGHT TO BRING OR PARTICIPATE IN A CLASS PROCEEDING.

Lessor/Owner:
FlexShopper, LLC
2650 North Military Trail, Suite 230
Boca Raton, FL 33431
855-353-9289
Help@FlexShopper.com
www.FlexShopper.com Lessee(s) Potential
Purchaser(s)
John Doe
123 address
Boca Raton, FL 33431

In this Rental Purchase Agreement/Lease ("Lease"), "you" and "your" mean the person(s) signing this Lease as Lessee/ Potential Purchaser, and "we", "our" and "us" mean the Lessor/Owner identified above and its successors and assigns.

1. Rental Property: Your are renting [(1) New - UN50EH5300FXZA-SAM-FLX- Samsung-Samsung UN50EH5300-50" LED-backlit LCD TV] the items described on Exhibit a hereto (the "Property"). The Property is new and has not been rented. The Cash Price of the Property is $907.35. If there are multiple Property items, the Cash Price of each item is set forth on Exhibit A. The Cash Price is the amount we would charge for a cash ale of the Property. The Cash Price does not include applicable sales/use taxes.

2. Lease Terms Payments Purchase Rights: The initial term of this Lease commences when the Lease is signed and ends on the Friday your 12th weekly payment is due (excluding the payment due on the date of this Lease. Unless this Lease ends in accordance with ¶ 6 it will automatically renew at the end of of then-current term for an additional term of 12 weeks or if earlier the period when your final ☑ BY CHECKING HERE, AND CLICKING "COMPLETE YOUR LEASE & ORDER", YOUR AGREE TO ALL OF THE TERMS OF THE LEASE, INCLUDING THE PAYMENT AUTHORIZATION (¶17), ARBITRATION PROVISION (¶18) AND CONSENT TO RECEIPT OF ELECTRONIC COMMUNICATIONS (¶19).

3446

( Complete your lease & order )

Please read & scroll to bottom of your lease and check the box above before clicking "Complete your lease & order".

| ELECTRONICS SUPERSTORE | ← Back to Cart | [1] Address Information | [2] Shipping & Payment | [3] Order Review |

Your order has been submitted

Thank you for your order

You can review your order details below. We may call you prior to shipment if any follow-up is necessary. When your order is ready to ship, we will send you a confirmation e-mail.

Estimated Delivery: Jan 6(by 11:00PM)

Please note this order can no longer be modified through our website. If you need to change your order please contact us at 1.888.955.6000

SMS

Signup for cellular SMS notifications and receive a text message when your order has been delivered. Enter your mobile number is you wish to stay informed. Msg & Data Rates May Apply Enter your mobile number I agree to the SMS terms

Order Summary

Print your order

Order Number: 40269059
Order Date: 12/30/2013 8:31 AM

| BILLING ADDRESS | SHIPPING ADDRESS | PAYMENT METHOD |
|---|---|---|
| John Doe | John Doe | FlexShopper |
| 2650 North Military Trail, Suite 230 | 2650 North Military Trail, Suite 230 | |
| Boca Raton, FL 33431 | Boca Raton, FL 33431 | |
| 561-949-0785 | 561-949-0785 | |
| john.doe@flexshopper.com | | |

Items

| | Nikon D3100 Kit 14.2-megapixel digital SLR camera with 18-55mm lens and HD movie mode | $499.95 Instant Rebate $70.00 off | 1 | $429.95 You save $70.00 |

054D3100

Merchandise SubTotal  $429.95
Standard Shipping  FREE
Order Total  $429.95

COMPUTER IMPLEMENTED SYSTEM AND METHOD FOR A RENT-TO-OWN PROGRAM

PRIORITY

This application is a continuation application claiming priority under 35 U.S.C. § 120 to U.S. patent application Ser. No. 14/293,751, filed on Jun. 2, 2014, entitled COMPUTER IMPLEMENTED SYSTEM AND METHOD FOR A RENT-TO-OWN PROGRAM, which claims the benefit under 35 U.S.C. § 119(e) of U.S. Provisional Patent Application Ser. No. 61/829,489, filed on May 31, 2013, entitled COMPUTER IMPLEMENTED SYSTEM AND METHOD FOR A RENT-TO-OWN PROGRAM and U.S. Provisional Patent Application Ser. No. 61/923,890, filed on Jan. 6, 2014, entitled COMPUTER IMPLEMENTED SYSTEM AND METHOD FOR RENT-TO-OWN PAYMENT OPTION, the entire disclosures of which are hereby incorporated by reference herein.

BACKGROUND

Rent-to-own (RTO) generally refers to a rental-purchase. An RTO transaction is typically a type of legally documented transaction under which goods are leased or rented in exchange for a regularly scheduled payment with the option to purchase at some point during the agreement. The goods are typically durable goods such as furniture, consumer electronics, home appliances, tires, etc., but also may include other merchandise such as musical instruments and jewelry, among others. RTO transactions began in the United States in the 1950's and 1960's. Today, according to the Association of Progressive Rental Organizations (APRO), RTO is an $8.5-billion industry. It is estimated that the RTO industry currently serves more than 6 million customers a year. According to APRO, there are approximately 9,800 stores in all 50 states, Mexico and Canada, and the RTO industry serves 4.8 million customers (households) at any given time in the year.

Consumers within the RTO industry find RTO transactions appealing, particularly for acquisition of durable goods and especially because they do not incur the long-term financial obligations associated with credit sales. The term "rent" distinguishes rent-to-own from a retail credit sale. Furthermore, with an RTO transaction, customers often have the option of returning the goods and ending future payment obligations.

However, there is still a need to make the RTO industry and an RTO transaction even more accessible and efficient to consumers and to do so in a manner that includes technological accessibility.

DRAWINGS

The present disclosure will become more fully understood from the detailed description and the accompanying drawings, which are not necessarily to scale, wherein:

FIG. 12 is a screen shot showing one embodiment of a screen that may be displayed to a consumer by a retailer e-commerce server that is running or in communication with an RTO plug-in.

FIG. 15-23 are screen shots showing embodiments of a user interface that may be provided to the consumer to register with the RTO management system.

FIGS. 24-26 are screen shots showing embodiments of screens from the user interface of FIGS. 15-23 that may be shown to the consumer during the application process to inform the consumer of the consumer's spending limit.

FIGS. 27-29 are screen shots showing embodiments of a user interface that may be provided to the consumer that has selected a good through a product interface, such as the UI of FIG. 4 provided by the RTO management system.

FIGS. 30-33 are screen shots showing embodiments of a user interface that may be provided to the consumer that has selected goods at a retail store, for example, as described herein with respect to FIGS. 1-3.

FIGS. 34-42 are screen shots showing embodiments of a user interface that may be provided to the consumer that utilizes an RTO plug-in, as described herein to use an RTO transaction to acquire goods through an e-commerce website.

DESCRIPTION

Figure 1:
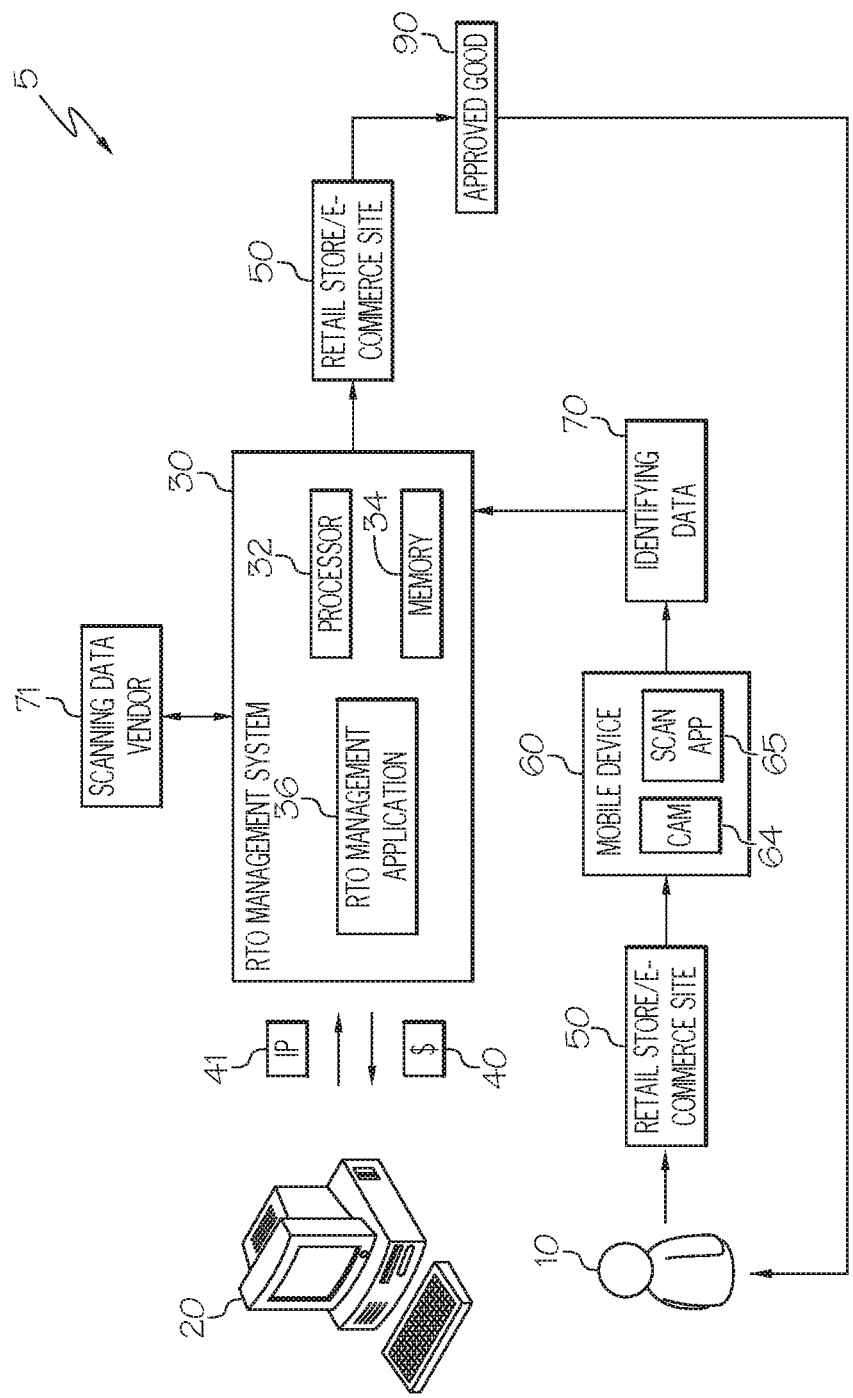
FIG. 1 is a diagram of one embodiment of an environment for facilitating rent-to-own transactions.

The present disclosure relates to a computer-implemented system and method for processing a rent-to-own (RTO) transaction. Some embodiments relate to facilitating an RTO transaction on an e-commerce website including, for example, alternative computer-implemented website configurations and features for an RTO transaction. The term "rent-to-own" (RTO), as used herein, generally refers to a rental agreement or a lease agreement. Rent-to-own is also interchangeably referred to as "lease-to-own" (LTO) for purposes of the present disclosure.

Various embodiments described herein relate to the rent-to-own industry, particularly to computer-implemented systems and methods suitable for obtaining goods on a rent-to-own basis. An implementing company may offer consumers an RTO program under which the consumers may enter into RTO transactions with the implementing company for the lease of various goods. The goods may be offered through the implementing company or through third-party retailers, as described herein. In various embodiments, the implementing company may implement and/or be associated with an RTO management system for managing the initiation and/or management of the RTO transactions. As described herein, the RTO management system may be implemented as a single computer device, multiple computer devices and/or utilizing a computer cloud network.

In various embodiments, the present disclosure provides consumers with the ability to enter RTO transactions at a greater variety of stores, including online retailers, and not just at a conventional RTO store. Also, various embodiments of the present disclosure make the RTO transactions more accessible to more people by eliminating the requirement that the consumer physically visit a brick and mortar RTO store or other retailer that offers such a program. In some embodiments, the present disclosure makes RTO transactions more accessible as a method of payment for online, web/Internet-based transaction.

In an aspect of the present disclosure, a computer system and method is provided for offering RTO transactions through an electronic commerce (e-commerce) website. For example, brick-and-mortar retailers, e-commerce retailers and/or wholesalers may send data feeds of their goods to the RTO management system. The RTO management system may offer the goods to consumers for RTO transactions via a website or other user interface and/or through a third-party website. The consumer may select a product and enter into an RTO transaction with the implementing company. The implementing company may purchase the selected good and then rent the good to the consumer, subject to the terms of the RTO transaction.

In another aspect, various embodiments are directed to a computer-implemented RTO computer software application or plug-in for choosing an RTO payment option on an e-commerce website. The computer-software "plug-in" or application may integrate RTO as a payment option in the software of an e-commerce website or platform. Once the application or plug-in is loaded or integrated to an e-commerce website or platform, the e-commerce website or platform may offer RTO as an option for financing the acquisition of goods. When a consumer selects RTO as a payment method, the consumer's transaction may be completed on-line as an RTO transaction. For example, the consumer may enter into a lease or rental contract with the implementing company (e.g., through the RTO management system). The implementing company may purchase the selected good, which is provided to the consumer. Thus, the plug-in may be a computer executable computer software application that is integrated directly into the retailer's website/platform as a new payment method. The plug-in may be available at the checkout to provide a consumer with insufficient cash or credit the ability to enter into an RTO transaction.

In some embodiments, the plug-in application is made available to an e-commerce platform or website as a downloadable computer software application available from an online application store. Examples of such e-commerce focused application stores include, but are not limited to, MAGENTO, VOLUSION, and SHOPIFY. The plug-in application could also be customized to suit a particular website or platform.

In another aspect, a consumer may be assigned a personal shopper or assistant, which may be implemented by the RTO management system. The consumer may register online with a computer and/or computer cloud network associated with the implementing company and receives an approved spending limit. The approved spending limit may be determined by the RTO management system. The approved spending limit may be calculated within a designated time period. At a "personal shopper" portal (e.g., implemented by the RTO management system), the consumer may enter a Stock Keeping Unit (SKU) or product description from the store or e-commerce site selling the product. The RTO shopper or assistant locates the product and confirms the item and lease terms. The consumer may agree to the lease terms in an agreement. If so, the implementing company may purchase the product with shipment to the consumer. The consumer would make lease payments in accordance with a state or federal compliant RTO transaction.

Further areas of applicability of the present disclosure will become apparent from the detailed description provided hereinafter. It should be understood that the detailed description and specific examples, while indicating the preferred embodiment of the invention, are intended for purposes of illustration only and are not intended to limit the scope of the invention.

The following detailed description of the embodiment(s) is merely exemplary in nature and is in no way intended to limit the disclosure, its application, or uses. FIG. 1 is a diagram of one embodiment of an environment 5 for facilitating rent-to-own transactions. As shown generally in FIG. 1, a consumer 10 uses a consumer computer device 20 to provide input data 41 for registering with a rent-to-own (RTO) program. The computer device 20 may be any suitable computer or computing device such as, for example, a tablet computer, a smart phone, a laptop computer, any other mobile computing device, a desktop computer, etc. The input data 41 is provided to an RTO management system 30, for example, through an Internet website hosted by or in communication with the RTO management system 30. Also, in some embodiments, the input data 41 is provided to the RTO management system 30 via an interactive application executed at the computer device 20. The RTO management system 30 may be or comprise, for example, a computer or an associated server of the implementing company and/or a computer/server of a third party operating on implementing company. The RTO management system 30 generally comprises at least one processor 32, memory 34, and a computer software application 36 suitable for executing an RTO program. The memory 34 comprises instructions executable by the processor 32. The RTO management application 36 may be programmed to implement automated decision rules and computer-implemented algorithms which are used to, for example, estimate, calculate and generate recommendations, spending limits, periodic payments and state or federal compliant agreements under the RTO program.

The RTO management system 30 or any associated server may be of any appropriate design, in general, including a main frame, mini-computer or a personal computer system. The RTO management system 30 processes the input data 41 to provide an approved spending limit 40. The spending limit 40 is the maximum value of the good(s) that a consumer is eligible to rent or lease under an RTO program. In some embodiments, the spending limit 40 may be a positive monetary amount or may be zero. For example, if the consumer 10 is not approved for an RTO transaction, then the spending limit 40 may be zero. The RTO management system 30 sends an electronic message with the spending limit 40 to the computer device 20 of the consumer 10. The electronic message may be sent, by text message, e-mail, an Internet website, an interactive application executed at the computer device 20, etc. For example, in some embodiments, the spending limit 40 is provided through the same channel through which the input data 41 was provided (e.g., an interactive application, an Internet web site, etc.).

When the spending limit 40 is greater than zero, the consumer 10 may commence shopping at the retailer 50. The retailer 50 is, for example, a brick and mortar retail store or an online retailer/e-commerce site. The consumer 10 uses a mobile computer device 60 having scanning capabilities such as a smart phone. For example, the mobile computer device 60 may comprise a camera 64 or other suitable sensor and a scanning application 65 for scanning codes such as Universal Product Codes (UPC codes) or other product information. In some embodiments, the scanning application 65 and mobile device 50 are also used by the user 10 to provide the input information 41, for example, in place of the computer device 20. The scanning application 65 is optionally provided by the implementing company to the consumer 10 for downloading or is a component of another software application provided by the implementing company. Alternatively, a scanning application providing scanning capability for scanning of codes, such as barcodes, more generally is used. It is contemplated and within the scope of the present disclosure that the consumer has other options of identifying the good for the company having the RTO program including, but not limited to, manually entering the product code into the online or mobile application of the company.

The consumer 10 selects a good for an RTO transaction and uses the mobile device 60 to obtain identifying data 70 that indicates the good selected by the consumer 10. The identifying data 70 may be obtained in any suitable manner. For example, the user 10 may use the mobile device 60 to scan a UPC code or other machine-readable representation of the selected good. Examples of codes or other machine-readable representations of data include, but are not limited to, barcodes such as linear barcodes and matrix (2D) barcodes, coded pictures, and quick response (QR) codes. In some embodiments, the user 10 reads the identifying data 70 from the good or associated display and manually enters the identifying data 70 into the mobile device 50 using a keypad, touchscreen, or other input device.

The mobile device 60 may transmit the identifying data 70 to the RTO management system 30, where it may be received by the RTO management application 36. In some embodiments, the RTO management system 30 (and/or cloud RTO management system 110 described below with respect to FIG. 2) may be in communication with a scanning data vendor system 71. For example, the RTO management system 30 may provide the identifying data 70 to the scanning data vendor system 71. The scanning data vendor system 71 may return various data describing the selected good including, for example, a price of the good. In some embodiments, the scanning data vendor system 71 may also provide an indication of additional retailers, other than the retail store or e-commerce site 50, where the selected good is available along with a price of the selected good at the additional retailers. In some embodiments, if another retailer is offering the selected good at a price lower than that offered by the retail store and/or e-commerce site 50, the scanning data vendor system 71 provides this information to the RTO software application 36, which in turn notifies the consumer 10 and/or modifies to the requested RTO transaction to be executed with the lowest-price retailer. Examples of scanning data vendors may include SHOPSAVVY, REDLASER, etc.

The RTO management system 30 uses the identifying data 70 received by the RTO management application 36 to process program criteria and to determine if the good qualifies as a transaction eligible good under the RTO program. For example, the RTO management application 36 considers program criteria such as the price, type and/or description of the good. The RTO management system 30 may notify the consumer 10 whether the good is approved as a transaction eligible good. For example, the RTO management system 30 may send the consumer 10 an e-mail or text message. Also, in some embodiments, RTO management system 30 may indicate whether the selected good is transaction eligible through an Internet website and/or interactive application. For example, the consumer 10 may log-in to the website or application. If the selected good is transaction eligible, the message may be accompanied by terms for the RTO transaction such as, for example, the legal terms and disclosures of a rent-to-own transaction in accordance with state or federal laws, and the periodic rental cost or lease amount, and a lease duration. In some embodiments, the RTO application 36 is also programmed to generate a draft RTO agreement for the consumer 10. For example, the RTO application 36 may receive an indication of the location of the consumer 10 and pull a form RTO agreement approved for that jurisdiction. The RTO application 36 may populate the form, for example, based on the properties of the selected good.

If the good is a transaction eligible good, and the consumer electronically accepts the terms, the RTO management system 30 purchases the approved good 90 for the consumer under the RTO program. The RTO management system 30 arranges for the approved good 90 to be picked-up at the store, held, or shipped to the consumer. The consumer 10 who registered with the RTO program pays a periodic rental fee or lease amount in accordance with a state or federal compliant RTO agreement to the company operating the RTO program and record of the payment is optionally sent to the computer. In some embodiments, the RTO application 36 may be configured to automatically deduct periodic payments for the RTO transaction from the consumer's bank account or debit card. The period of the payments may be any suitable value, as defined by the terms of the RTO agreement including, for example, weekly, bi-weekly or monthly.

Figure 2:
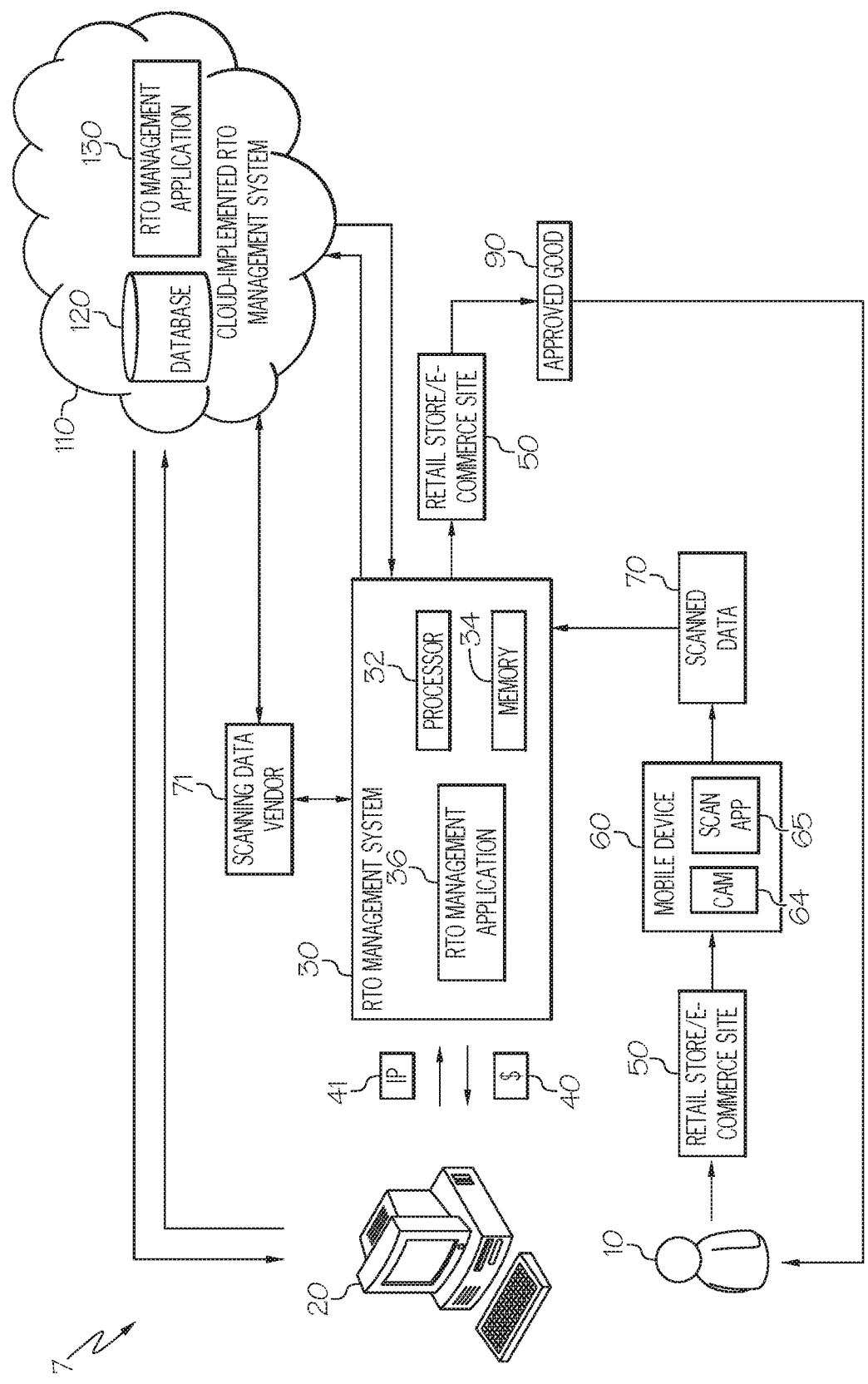
FIG. 2 is a diagram of another embodiment of an environment for facilitating rent-to-own transactions.

FIG. 2 is a diagram of another embodiment 7 of an environment for facilitating rent-to-own transactions, for example, in a cloud computing network. The environment 7 may be similar to the environment 5 described above and, in some embodiments, comprises a cloud-implemented RTO management system 110. The cloud-implemented RTO management system 110 or cloud RTO management system 110 may be implemented by remote and, in some embodiments, distributed hardware accessible to the computer device 20, mobile device 60, and/or RTO management system 30 via a network, such as the Internet. For example, the cloud RTO management system 110 may comprise a plurality of computer devices that may be geographically distributed. The cloud RTO management system 110 may comprise a cloud RTO management application 130 and a database 120. The database 120 may comprise data regarding RTO transactions.

RTO transactions utilizing the cloud RTO management system 110 may proceed in a manner similar to that described herein above with respect to FIG. 1. In some embodiments, the cloud RTO management system 110 and cloud RTO management application 130 may execute the functionality of the RTO management system 30 and RTO management application 36 described herein, thereby replacing the system 30 and application 36. In other embodiments, the cloud RTO management system and cloud RTO management application 130 may supplement the system 30 and application 36. For example, the system 30 and application 36 may push some aspects of RTO management, such as spending limit determination and good eligibility determination, to the cloud system 110 and cloud application 130.

As shown generally in FIG. 2, a consumer 10 uses the computer device 20 to provide input data 41 for registering with an RTO program (e.g., registering with the RTO management system 30 managing the RTO program). The input data 41 is transmitted to the RTO management system 30, as described with respect to FIG. 1, or may be transmitted to a cloud computing network 110. The cloud RTO management application 130 may be programmed to execute some or all of the processing to implement automated decision rules and computer-implemented algorithms which are used to, for example, estimate, calculate and generate recommendations, spending limits, periodic payments and state or federal compliant agreements under the RTO program. The RTO management system 30 and/or cloud RTO management system 110 may processes the input data 41 to provide an approved spending limit 40, as described herein. The RTO management system 30 and/or cloud RTO management system 110 sends an electronic message with the spending limit 40 to the computer device 20 of the consumer 10, for example, as described herein.

When the spending limit 40 is greater than zero, the consumer 10 may commence shopping at a retailer 50. The retailer 50 is, for example, a brick and mortar retail store or an online retailer/e-commerce site. The consumer 10 uses the mobile computer device 60 having scanning capabilities such as a smart phone. The scanning application 65 may optionally be provided by to the consumer 10 by the implementing company, for example, through the RTO management system 30 and/or the cloud RTO management system 110. When the customer 10 selects a good to rent-to-own and uses the mobile device 60 to obtain identifying data 70, the identifying data may be provide to the RTO management system 30 and/or the cloud RTO management system 110. The RTO management system 30, using RTO management application 36, and/or the cloud RTO management system 110, using cloud RTO management application 130, may process program criteria and determine if the selected good qualifies as a transaction eligible good under the RTO program. The RTO management system 30 or cloud RTO management system 110 may notify the consumer 10 whether the selected good is approved as a transaction eligible good, for example, through an Internet website and/or interactive application. In some embodiments, the consumer 10 may log-in to the website or application provided by the system 30 and/or the system 110.

If the selected good is transaction eligible, the message may be accompanied by the legal terms and disclosures of a rent-to-own transaction in accordance with state or federal laws, and the periodic rental cost or lease amount. For example, FIGS. 28, 32 and 41, described below, illustrate an example way that the consumer 10 may accept the terms of the RTO transaction. If the good is a transaction eligible good, and the consumer electronically accepts the terms, the RTO management system 30 or the cloud RTO management system 110 may purchases the approved good 90 for the consumer under the RTO program. The RTO management system 30 and/or cloud RTO management system 110 arranges for the approved good 90 to be picked-up at the store, held, or shipped to the consumer. The consumer who registered with the RTO program pays a periodic rental or lease payment in accordance with a state or federal compliant RTO agreement to the company operating the RTO program and record of the payment is optionally sent to the RTO management system 30 and/or cloud RTO management system 110. The period of the payments may be any suitable value, as defined by the terms of RTO agreement, for example, weekly, bi-weekly or monthly.

Figure 3:
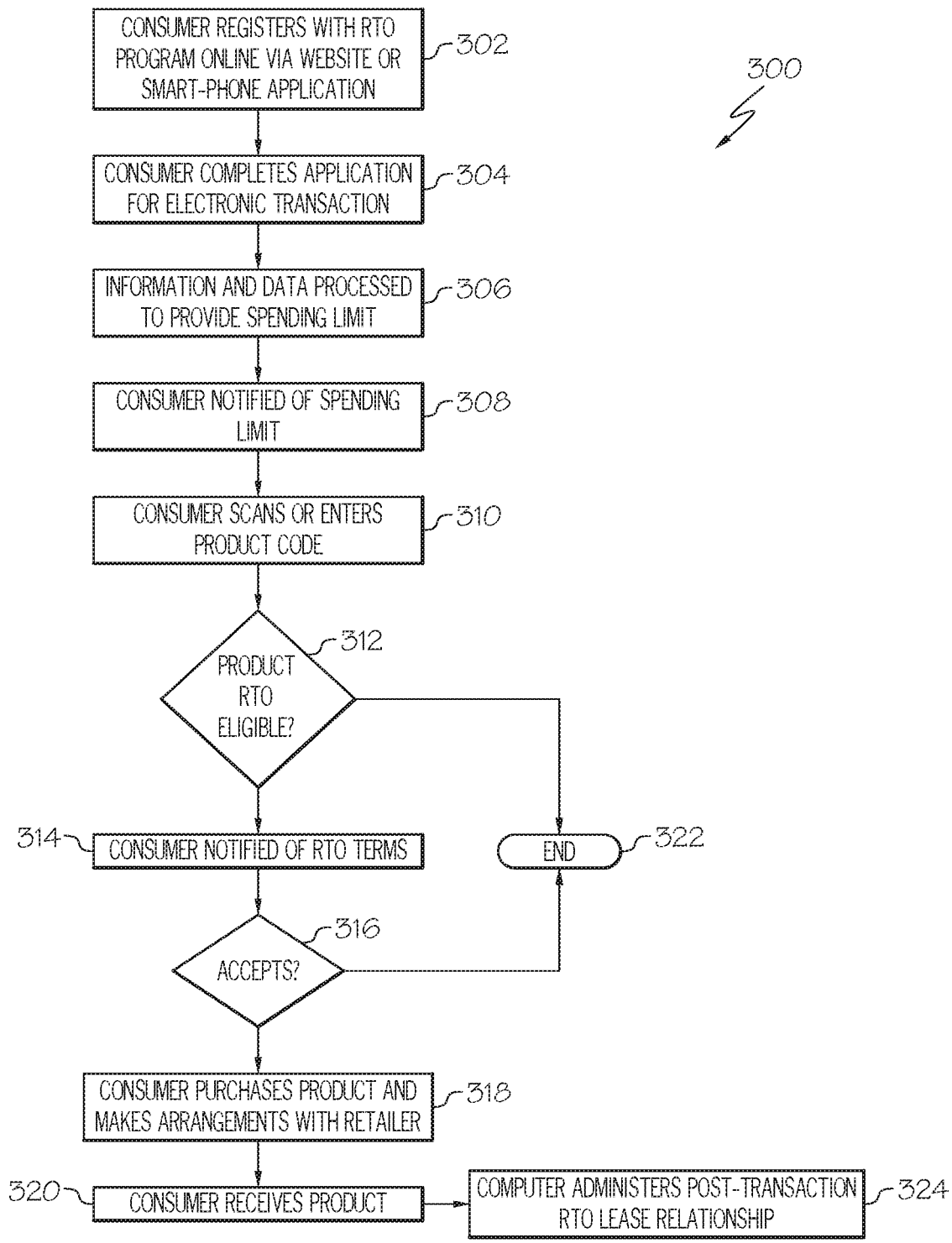
FIG. 3 is a flow chart showing one embodiment of a process flow for a rent-to-own transaction.

FIG. 3 is a flow chart showing one embodiment of a process flow 300 for a rent-to-own transaction. The process flow 300 illustrated in FIG. 3 may provide a streamlined method of fulfillment for a non-creditworthy consumer to lease or rent products under a rent-to-own (RTO) agreement by scanning a barcode such as a universal product code (UPC) barcode(s) with a mobile device such as a smart phone at retail stores. A target consumer for the method of the present disclosure is a person who does not have credit to buy durable goods and, without cash, typically cannot buy durable goods. At 302, a consumer 10 registers with the implementing company. The registration may be performed, for example, through a website or a computer software application such as a smart phone application, provided and/or hosted by the system 30 and/or the system 110. As a part of the registration, the consumer 10 may be provided with a password protected account. At 304, the consumer may complete an application online or through the computer software application and provide input information to see if the consumer qualifies for an RTO spending limit 40. An example interface for receiving the input information is provided below at FIGS. 15-23. The RTO management application 36 and/or 130, may consider the input information along with third party data such as credit bureau reports, to provide a spending limit for purposes of an RTO transaction at 306. If the consumer does not qualify for a non-zero spending limit 40, the transaction may end. At 308, RTO management application 36 and/or 130 may notify the consumer 10 of the spending limit 40, for example, by a text, email or through the computer software application.

At 310, the consumer may scan or enter a product code, such as a UPC, from a good that the consumer would like to rent, lease and/or ultimately purchase through the RTO management application 36 and/or 130. For example, the consumer 10 may travel to a physical location of the retail store and/or visit an e-commerce website of the retail store. In some embodiments, the consumer 10 uses a mobile device to scan desired item or to enter a UPC. At 312, the RTO management application 36 and/or 130 determines whether the selected good is a transaction eligible good, for example, by considering the type and price of item. For example, if the product is a durable good such as an appliance, electronics or furniture, it may be considered transaction eligible. If the selected good is not transaction eligible, the transaction may end at 322. If the selected good is transaction eligible, the RTO management application 36 and/or 130 may notify the consumer 10 and provide transaction terms at 314, for example, as illustrated below with respect to FIGS. 28, 32 and 41. The transaction terms may include, for example, a periodic payment, a duration of the lease, etc. The consumer 10 may accept or decline the transaction terms at 316. For example, the consumer 10 may accept the transaction terms by electronically signing a federal and/or state compliant RTO agreement. If the customer 10 declines the transaction terms, then the transaction terminates at 322. If the consumer 10 accepts the transaction terms, the implementing company, via the RTO management application 36 and/or 130, at 318, purchases the good online or by other electronic methods from the retailer with or without human intervention and arranges for pick-up at the store, hold, or delivery to the consumer 10. The consumer 10 receives the good at 320.

For example, as another feature of the present disclosure, a consumer 10 may take the good to the cash register at the retail store. The RTO management application 36 and/or 130 may communicate a token to the mobile device 60. The token may indicate, for example, the selected good and an indication that the consumer 10 has been approved for an RTO transaction involving the good. The consumer 10 may communicate the token to a cash register or other check-out device at the retail store. The cash register or other check-out device may accept the token as an indication that the implementing company will provide the retailer with payment for the object. The token may be communicated to the cash register or check-out device in any suitable manner. In some embodiments, the token may be represented as a machine-readable code on a display of the mobile device 60. The cash register or other check-out device may comprise capabilities for scanning the machine readable code, thereby receiving the token. Also in some embodiments, the mobile device 60 may be configured to transmit the token to the cash register or other check-out device via a wireless connection such as, for example, a WI-FI and/or BLUETOOTH connection. After delivery of the good, the RTO management application 36 and/or 130, at 324, administers an RTO, lease/rental relationship with consumer for handling matters including, but not limited to, collection of periodic payments, collections and returns, as described herein.

In accordance with aspects of the present disclosure, the RTO management application 36 and/or 130 is configured to bill and collect periodic payments from the consumer 10 in accordance with a state or federal compliant RTO agreement. The period of the payments may be any suitable value, as defined by the terms of the agreement including, for example, weekly, bi-weekly or monthly. In another aspect of the present disclosure, if a consumer decides to return a good, the consumer indicates through the computer software application on the mobile device 60 of the consumer 10 that the consumer 10 is returning the good. The consumer 10 then ships the good back to a location that may be indicated through the RTO management application 36 and/or 130. For example, the consumer 10 may be requested to ship the good to a fulfillment center or other physical location associated with the company implementing the RTO program. The return may be processed at the fulfillment center. In some embodiments, the good may be re-posted to a website associated with the RTO program (e.g., the product UI 43 described herein below) and may be rented again by another consumer 10. Alternative methods for processing returns may also be used.

Figure 4:
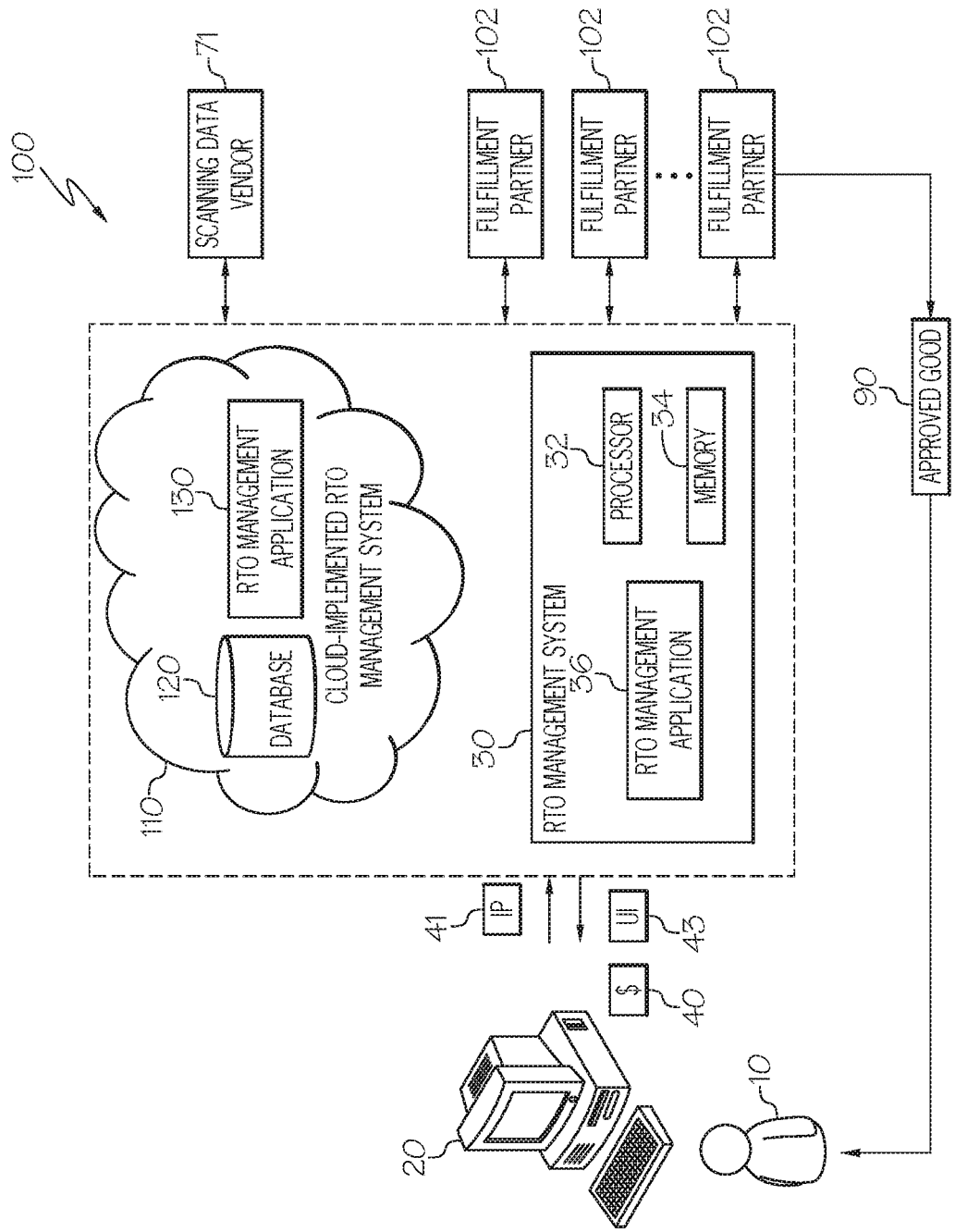
FIG. 4 is a diagram of another embodiment of an environment for facilitating rent-to-own transactions for products from multiple fulfillment partners through a single interface.

FIG. 4 is a diagram of another embodiment of an environment 100 for facilitating rent-to-own transactions for products from multiple fulfillment partners through a single interface. The consumer 10 may interact with the RTO management system 30 and RTO management application 36 and/or the cloud RTO management system 110 and cloud RTO management application 130 the computer device 20 in a manner similar to that described herein with respect to FIGS. 1 and 2. As illustrated in the environment 100, the RTO management application 36 and/or 130 may be in communication with one or more fulfillment partners 102. The fulfillment partners 102 may be sellers of goods. For example, the fulfillment partners 102 may include wholesalers as well as retailers. The RTO management application 36 and/or 130 may receive from the fulfillment partners 102 goods data describing goods offered for sale by the various fulfillment partners 102. The goods data may be received automatically in the form of data feeds provided by the fulfillment partners 102. In some embodiments, RTO management application 36 and/or 130 may scrape or crawl a website associated with a fulfillment partner 102 to obtain goods data.

In some embodiments, the RTO management application 36 and/or 130 may filter the goods data to identify transaction eligible goods, for example, goods that are eligible for an RTO transaction with a consumer. In addition to providing the consumer 10 with the spending limit 40, the RTO management application 36 and/or 130 may provide the consumer 10 with a product user interface or UI 43. The UI 43 may list and display the goods that are available to the consumer 10 for RTO transactions through the fulfillment partners 102.

Figure 5:
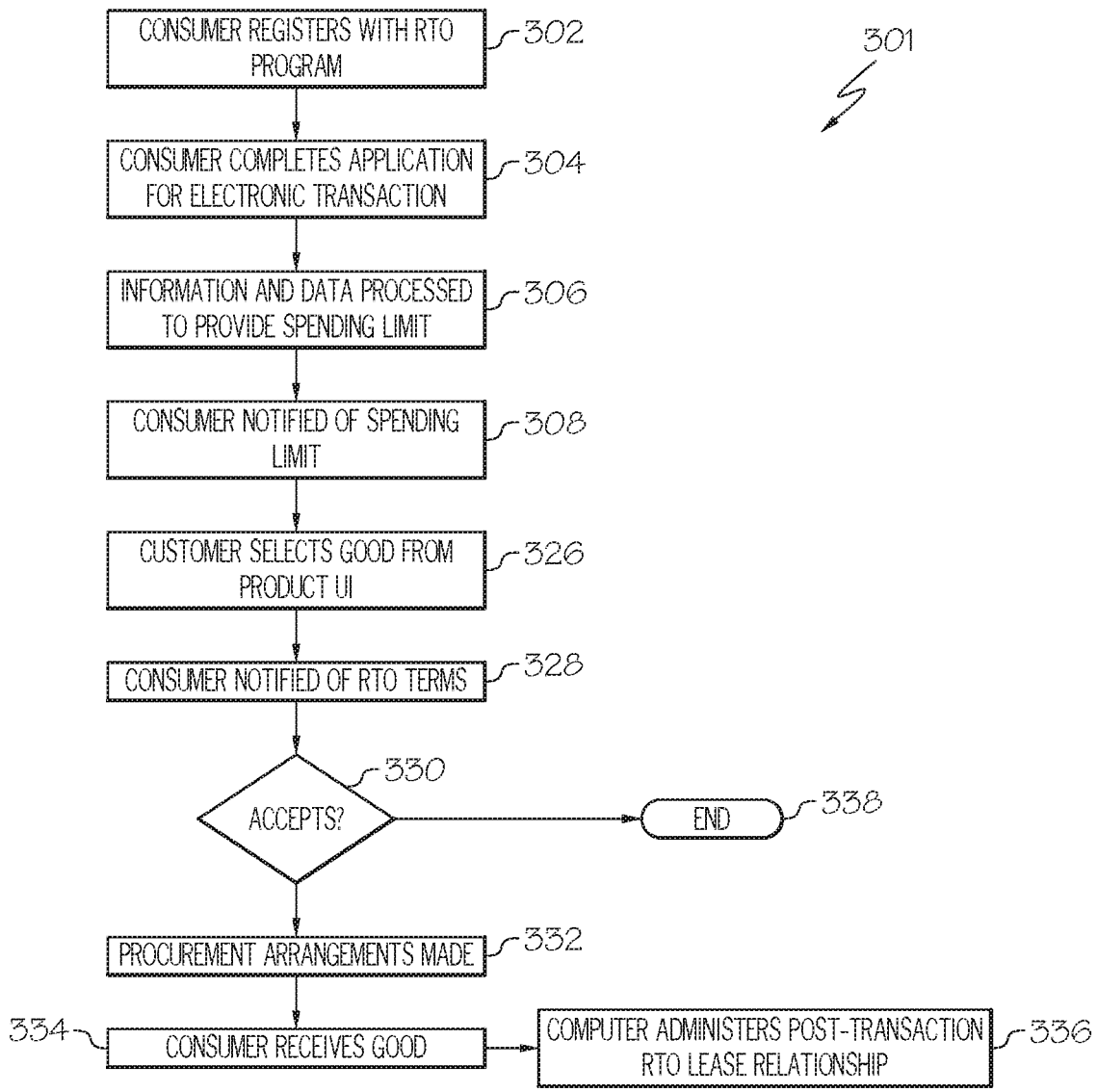
FIG. 5 is a flow chart showing one embodiment of a process flow for a rent-to-own transaction in the environment of FIG. 4.

FIG. 5 is a flow chart showing one embodiment of a process flow 301 for a rent-to-own transaction in the environment 100 of FIG. 4. At actions 302, 304, 306 and 308, the consumer 10 and RTO management application 36 and/or 130 may register the consumer 10 and determine a spending limit, for example, as described herein with respect to the process flow 300 of FIG. 3. At 326, presuming that the spending limit is greater than zero, the consumer 10 may select a good or goods from the product UI 43. In some embodiments, after the spending limit is obtained, the UI 43 may prevent the consumer 10 from selecting goods having a price that exceeds the spending limit. At 328, the RTO management application 36 and/or 130 may provide the consumer 10 with terms for an RTO transaction involving the selected good or goods, for example, as shown below at FIGS. 28, 32 and 41. If the consumer 10 declines the terms, the process may end at 338. If the consumer accepts the terms, procurement arrangements may be made at 330. For example, the fulfillment partner 102 selling the good may make arrangements to ship the approved good 90 to the consumer 10 or otherwise make the approved good available. The consumer 10 may receive the approved good 90 at 334, and the RTO management application 36 and/or 130 may administer the post-transaction RTO relationship with the consumer 10 at 336, for example, as described herein above. Various embodiments of the process flow 301 are described below with respect to FIGS. 27-29.

Figure 6:
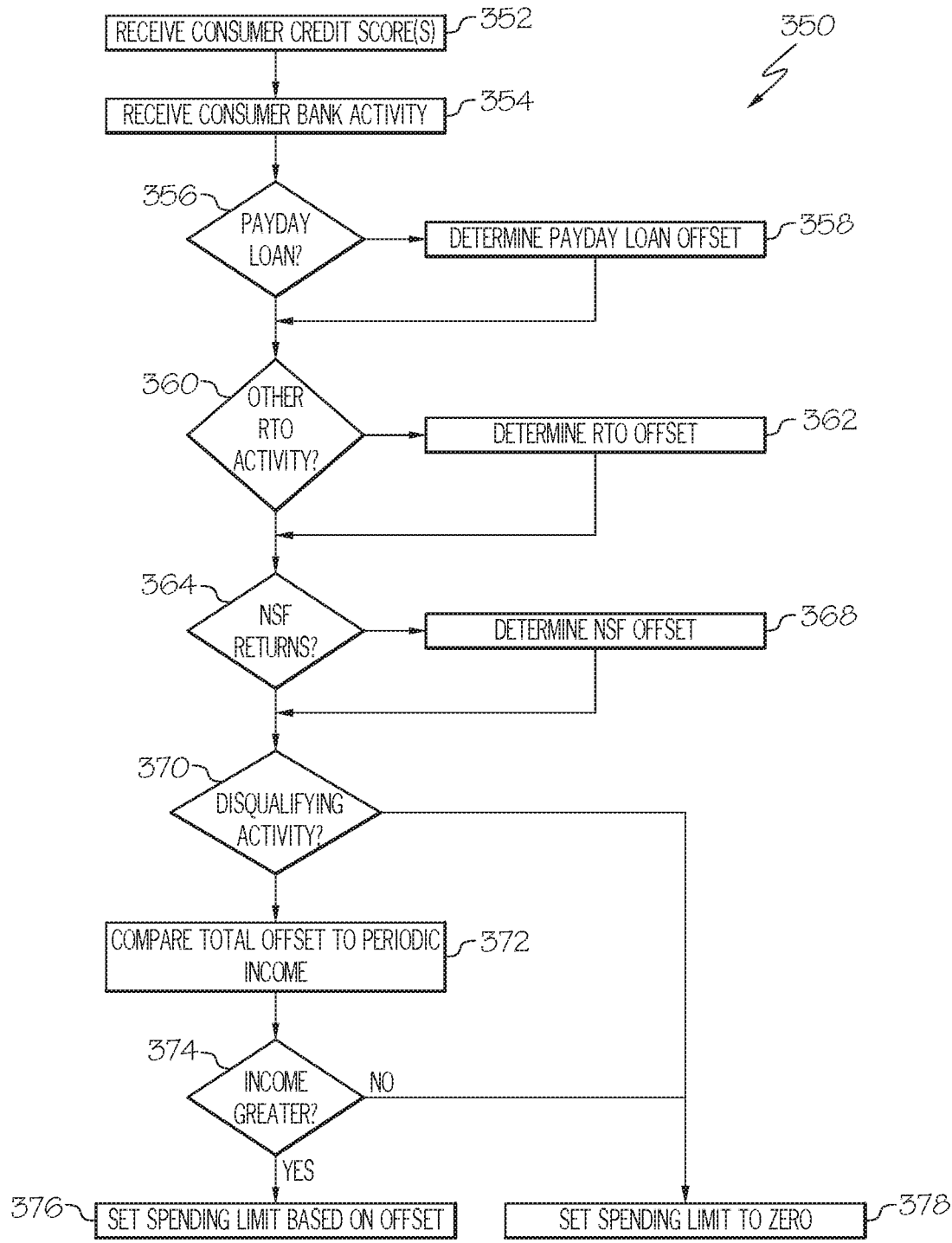
FIG. 6 is a flow chart showing one embodiment of a process flow that may be executed by the RTO program application to determine a spending limit for a consumer.

FIG. 6 is a flow chart showing one embodiment of a process flow 350 that may be executed by the RTO management application 36 and/or 130 to determine a spending limit for a consumer 10. At 352, the RTO management application 36 and/or 130 may receive a credit score or scores for the consumer 10. In some embodiments, the consumer 10 may not have a credit history, in which case this action may be omitted. For example, the RTO management application 36 and/or 130 may query a credit bureau regarding the consumer 10. If no history is available, the credit bureau may indicate so in a return report. At 354, the RTO management application 36 and/or 130 may receive data describing the consumers banking activity. This may include, for example, activity on a checking or other bank account of the consumer 10 and/or activity using pre-paid debit cards. In some embodiments, the banking activity data describes a predetermined period such as, for example, the ninety (90) days prior to the requested transaction.

At 356, the RTO management application 36 and/or 130 may analyze the banking activity data to determine if the consumer 10 has any banking activity consistent with a payday loan. Banking activity consistent with a payday loan may include, for example, a record of a payment to a payday loan provider. In some embodiments, consumers 10 who use payday loans may be considered less creditworthy. If payday loan activity is present, the RTO management application 36 and/or 130 may determine a payday loan offset to spending limit criteria at 358. The offset may be a deduction to the spending limit and/or an input to other logic affecting the spending limit. At 360, the RTO management application 36 and/or 130 may determine if the banking activity data indicates other RTO transactions, for example, with competing RTO firms. The presence of RTO activity may indicate that the customer 10 has other commitments and may not be able to handle additional payments. For example, if other RTO transactions are found at 360, the RTO management application 36 and/or 130 may determine an offset for the spending limit criteria at 362. The offset may be a deduction to the spending limit and/or an input to other logic affecting the spending limit. At 364, the RTO management application 36 and/or 130 may determine if the banking activity indicates any checks or payments returned for insufficient funds in the consumer's account. This may be referred to as a Not Sufficient Funds event or NSF. If NSF's are determined, the RTO management application 36 and/or 130 may determine an NSF offset at 368. The offset may be a deduction to the spending limit and/or an input to other logic affecting the spending limit.

Optionally, at 370, the RTO management application 36 and/or 130 may determine if the consumer's data indicates any disqualifying activity. Disqualifying activity may be activity indicating that the consumer 10 should not be provided with an RTO transaction. For example, if a consumer 10 has a payday loan and a threshold number of NSF's, the RTO management application 36 and/or 130 may consider this a disqualifying activity. Also, in some embodiments, the consumer 10 has a disqualifying activity when other RTO activity is detected and the consumer has NSF's. If disqualifying activity is found at 370, the RTO management application 36 and/or 130 may set the spending limit to zero at 378. If no disqualifying activity is detected, the RTO management application 36 and/or 130 may compare a total offset to the consumer's periodic income. The total offset may be a total amount to be compared to the consumer's periodic (e.g., monthly) income. A first component of the offset may be based on a predetermined percentage of the consumer's income. For example, the RTO management application 36 and/or 130 may assume that the consumer 10 is capable of spending no more than their disposable income, which may be a predetermined percentage of his or her periodic income on a new RTO transaction. Accordingly, the first component of the offset may be an inverse of the predetermined percentage (e.g., if the consumer is assumed to be capable of spending 20% of their income on a new RTO transaction, the first component of the offset may be set equal to 80% of the consumer's periodic income). Other example components of the offset may be, for example, as determined at 358, 362 and 368 above. For example, if the consumer 10 is making regular payday loan or other RTO payments, an offset equal to and/or relating to the amount of the payments may be applied. In some embodiments, NSF events result in additional offsets. At 374, the RTO management application 36 and/or 130 may determine if the consumer's periodic income is greater than the sum of the offsets. If not, then the spending limit may be set to zero at 378. If so, then a spending limit may be set at 376. For example, the RTO management application 36 and/or 130 may consider the difference between the consumer's periodic income and the offsets as well as a term for the RTO transaction and determine a corresponding spending limit.

In some embodiments, various factors describing the consumer including, for example, periodic income, payday loan activity, other RTO activity, NSF events, etc. may be characterized (e.g., by the amounts at stake for each transaction). Each factor may be assigned a weight and combined to generate a consumer score. The number of factors and the weighting assigned to each factor may be determined in any suitable manner. The factors may be combined in any suitable manner including, for example, addition, multiplication, matrix addition or multiplication, etc. The RTO management application 360 and/or 130 may determine the consumer's score and then set the consumer's spending limit based on the score. For example, potential values for the consumer score may map to corresponding spending limits.

Figure 7:
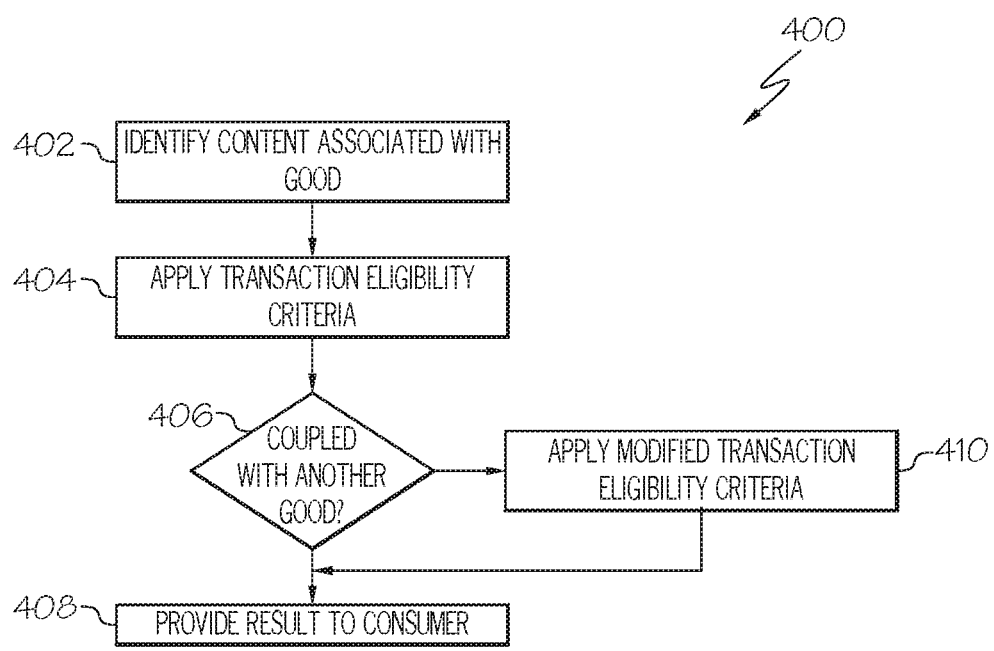
FIG. 7 is a flow chart showing one embodiment of a process flow that may be executed by the RTO program application to determine whether a requested good is transaction eligible.

FIG. 7 is a flow chart showing one embodiment of a process flow 400 that may be executed by the RTO management application 36 and/or 130 to determine whether a requested good is transaction eligible. As described herein, transaction eligible goods may include durable goods such as appliances, furniture, electronics, etc. The RTO management application 36 and/or 130 may receive a product description and product identifier, such as a Stock Keeping Unit or SKU number. The process flow 400 may be executed in any suitable context. For example, in the context of the environments 5, 7, and 100 the process flow 400 may be executed after the consumer 10 has selected a good to determine if the selected good is transaction eligible. Also, for example, in the context of the environment 100, the process flow 400 may be executed before the product UI 43 is provided to the consumer 10. For example, the RTO program application 30 and/or 130 may pre-screen goods offered by the fulfillment partners 102 and present only transaction eligible goods through the product UI 43.

At 402, the RTO management application 36 and/or 130 may identify content associated with a good, such as a product description. For example, the RTO management application 36 and/or 130 may consult one or more product data feeds to identify a description of the good. The RTO management application 36 and/or 130 may utilize the identifier of the good (e.g., the SKU) to identify one or more descriptions that are associated with the good. The description may come from fulfillment partners 102, retail stores or e-commerce sites 50, or third party data sources. At 404, the RTO management application 36 and/or 130 may apply transaction eligibility criteria to determine whether a product is transaction eligible. Transaction eligibility criteria may include, for example, a threshold price of the good, a type of the good, a threshold estimated life of the good, etc. For example, in some embodiments, only goods having a useful life that meets or exceeds the length of the RTO transaction may be considered transaction eligible. Also, in some embodiments, only goods having a price above a threshold price may be considered transaction eligible. The RTO management application 36 and/or 130 may determine properties of the good, such as the price, type, estimated life of the good, etc. by searching for a combination of certain words in the description.

In some embodiments, the RTO management application 36 and/or 130 may be programmed to relax transaction eligibility requirements for goods that are coupled with otherwise eligible goods in a single RTO transaction. For example, at 406, the RTO management application 36 and/or 130 may determine if a considered good is to be coupled in a single RTO transaction with another transaction eligible good. If so, then the RTO management application 36 and/or 130 may apply modified transaction criteria to the product at 410. Modified transaction criteria may include, for example, a lowered threshold price, additional allowed types, and/or a lowered threshold estimated useful life. For example, if the consumer 10 desires an RTO transaction for a refrigerator, then the RTO management application 36 and/or 130 may allow the consumer to include a toaster in the transaction as well, even if the toaster would not have otherwise been transaction eligible by itself. At 408, the RTO management application 36 and/or 130 may provide results of the transaction eligibility determination to the consumer 10, for example, as described herein.

Figure 8:
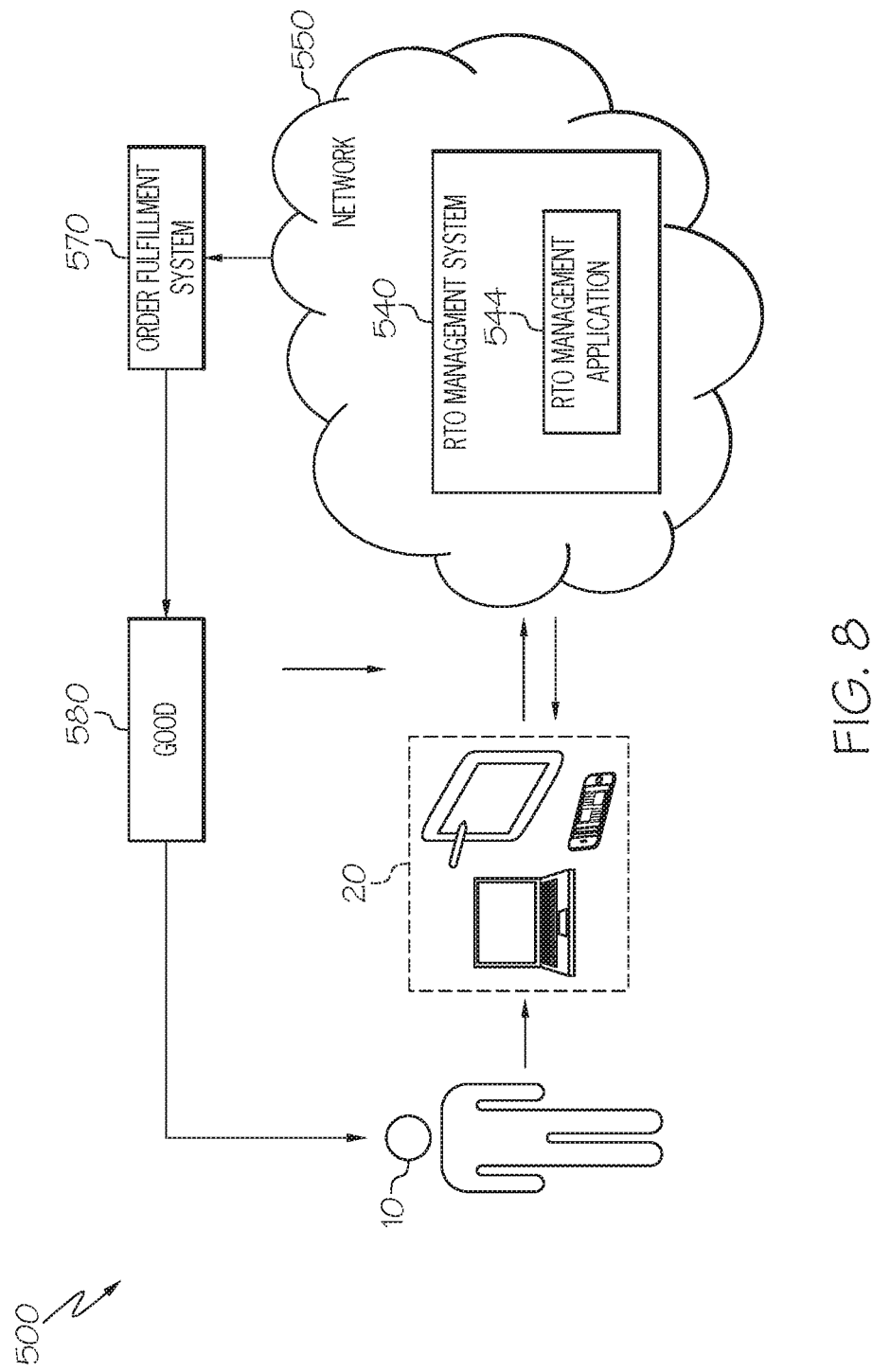
FIG. 8 is a diagram of another embodiment of an environment for facilitating rent-to-own transactions.

FIG. 8 is a diagram of another embodiment of an environment 500 for facilitating rent-to-own transactions. As shown generally in FIG. 8, the consumer 10 uses the computer device 20, as described herein, to access an electronic communications network 550. The network 550 may be and/or comprise any suitable wired and/or wireless network and may include all or a portion of the Internet. The consumer 10 may provide input information that is sent over the network 550 and received by an RTO management system 540 or other computer (not shown). The RTO management system 540 may be implemented in a manner similar that described above with respect to the RTO management system 30 and cloud RTO management system 110. For example, all or part of the RTO management system 540 may be implemented according to a cloud architecture.

The RTO management system 540 may execute an RTO management application 544. The RTO management application 544 may comprise automated decision rules and computer-implemented algorithms. The RTO management application 544 processes the data and information to estimate, calculate and generate recommendations, spending limits, periodic payments and state or federal compliant agreements under an RTO program.

As shown in FIG. 8, the consumer 10 selects a good for an RTO transaction. The consumer 10 places an order, using the computer device 20, for the selected good on an e-commerce website or platform, similar to 50 described above in FIGS. 1 and 2. Alternately, the consumer 10 may place the order via a product UI provided by the RTO management system 540, for example, similar to the UI 43 described with respect to FIG. 4. The e-commerce site communicates with the RTO management application 544. The RTO management application 544 determines a spending limit and prepares a lease, among other functions. After the order is completed, it is communicated to an order fulfillment system 570, and the selected good 780 is provided to the consumer 10, for example, by shipping. For example, the order fulfillment system 570 may be a shipping provider such as, for example, FEDEX or UPS. The consumer 10 who registered with the RTO management system 540 pays to the implementing company a periodic rental fee or lease amount in accordance with a state or federal compliant RTO agreement. For example, periodic payments may be made through the RTO management system 540 and, in some embodiments, the RTO management application 544 may automatically deduct payments from the consumer's bank account, as described herein. The period of the payments may be any suitable value, as defined by the terms of the RTO agreement including, for example, weekly, bi-weekly or monthly.

Figure 9:
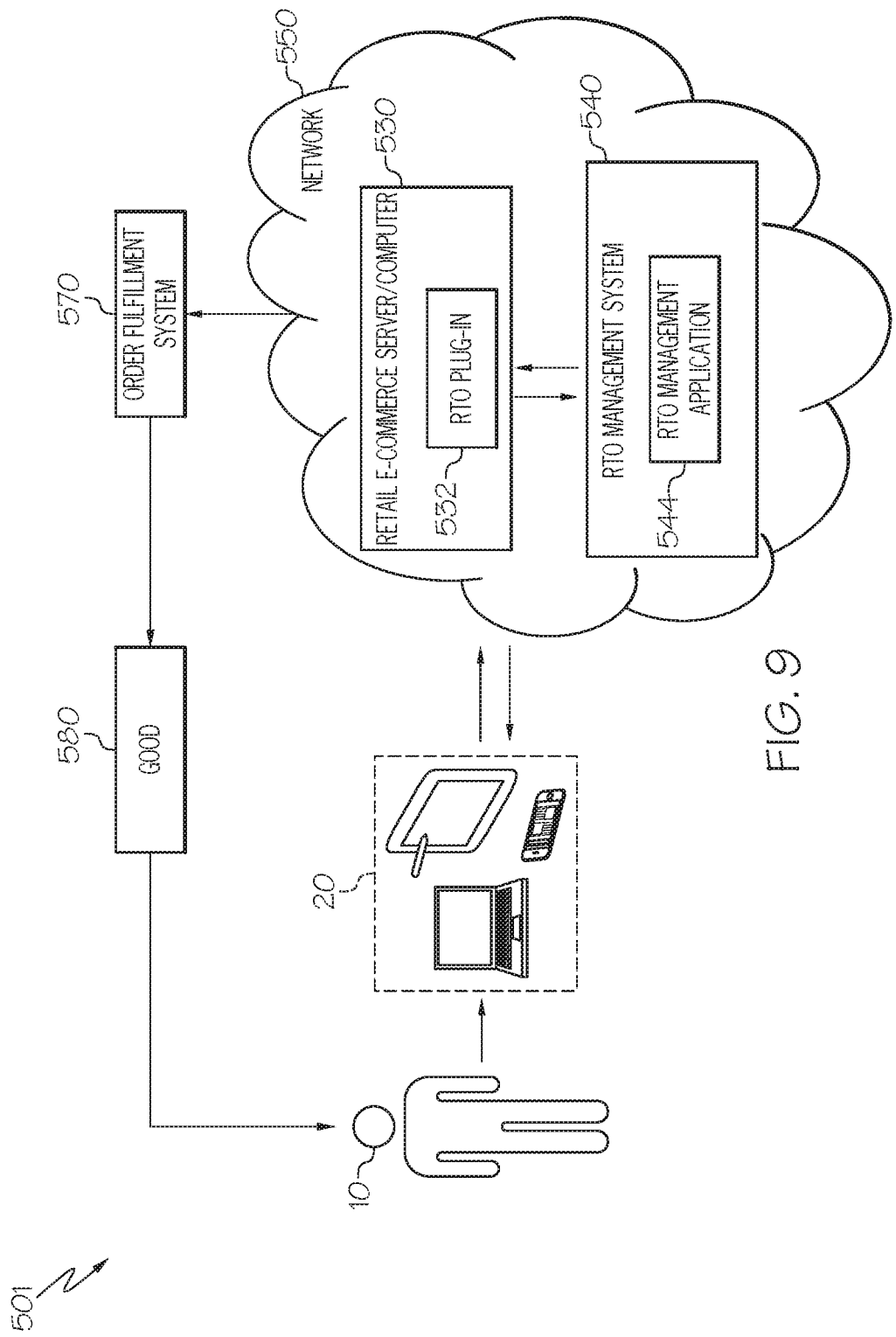
FIG. 9 is a diagram of another embodiment of an environment for facilitating rent-to-own transactions.

FIG. 9 is a diagram of another embodiment of an environment 501 for facilitating rent-to-own transactions. As shown generally in FIG. 9, the consumer 10 uses the computer device 20 to access the network 550. Via the network 550, the consumer 10 interacts with a retail e-commerce server/computer 530. In some embodiments, the retail e-commerce server/computer 530 is implemented by a third-party retailer not associated with the implementing company of the RTO program. As shown in FIG. 9, the retail e-commerce server/computer 530 comprises an RTO computer software application plug-in 532 suitable for accessing and communicating with the RTO management application 544. The plug-in 532 may integrate RTO as a payment method in the software of the retail e-commerce server 530. The retail e-commerce server/computer 530 and server/computer 540 may be of any appropriate design, in general, including a main frame, mini-computer or a personal computer system. As shown in FIG. 9, the retail e-commerce server 530 communicates with the RTO management system 540. For example, the retail e-commerce server 530 may access the RTO management application 544 using the plug-in 32.

The consumer 10 may select a good 580 from an interface provided by the retail e-commerce server 530. When a good 580 is selected, the retail e-commerce server 530 may provide the customer 10 with an option to acquire the good 580 with an RTO transaction. For example, if the consumer 10 elects to use an RTO transaction through the retail e-commerce server 530 having the RTO plug-in 532, the retail e-commerce server 530 communicates with the RTO management application 544 via the RTO plug-in 532. The RTO management application 544 may facilitate the RTO transaction, for example, as described herein, and may communicate back to the retail e-commerce server 530. The retail e-commerce server 530 may complete the order. For example, the RTO management application 544 may be configured to, through the RTO plug-in 532, provide payment to the retail e-commerce server 530 for the selected good 580. When payment is received and/or confirmed, the retail e-commerce server 530 may communicate an order for the good 580 to an order fulfillment system 570. The order fulfillment system 570 may be a third party retailer, e-tailer, wholesaler or shipping company. The good 580 may be shipped directly to the consumer 10. The consumer 10 who registered with the RTO program pays a periodic rental fee or lease amount in accordance with a state or federal compliant RTO agreement to the company implementing the RTO program. The period of the payments may be any suitable value, as defined by the RTO agreement including, for example, weekly, bi-weekly or monthly. In various embodiments, the RTO management application 544 and RTO plug-in 532 are in a one-to-many relationship in which a single RTO management application 544 is called upon by multiple RTO plug-ins 532 implemented at multiple retail e-commerce servers 530, for example, implemented by different retailers. Additional details of various embodiments utilizing an RTO plug-in are provided below with respect to FIGS. 34-42.

Figure 10:
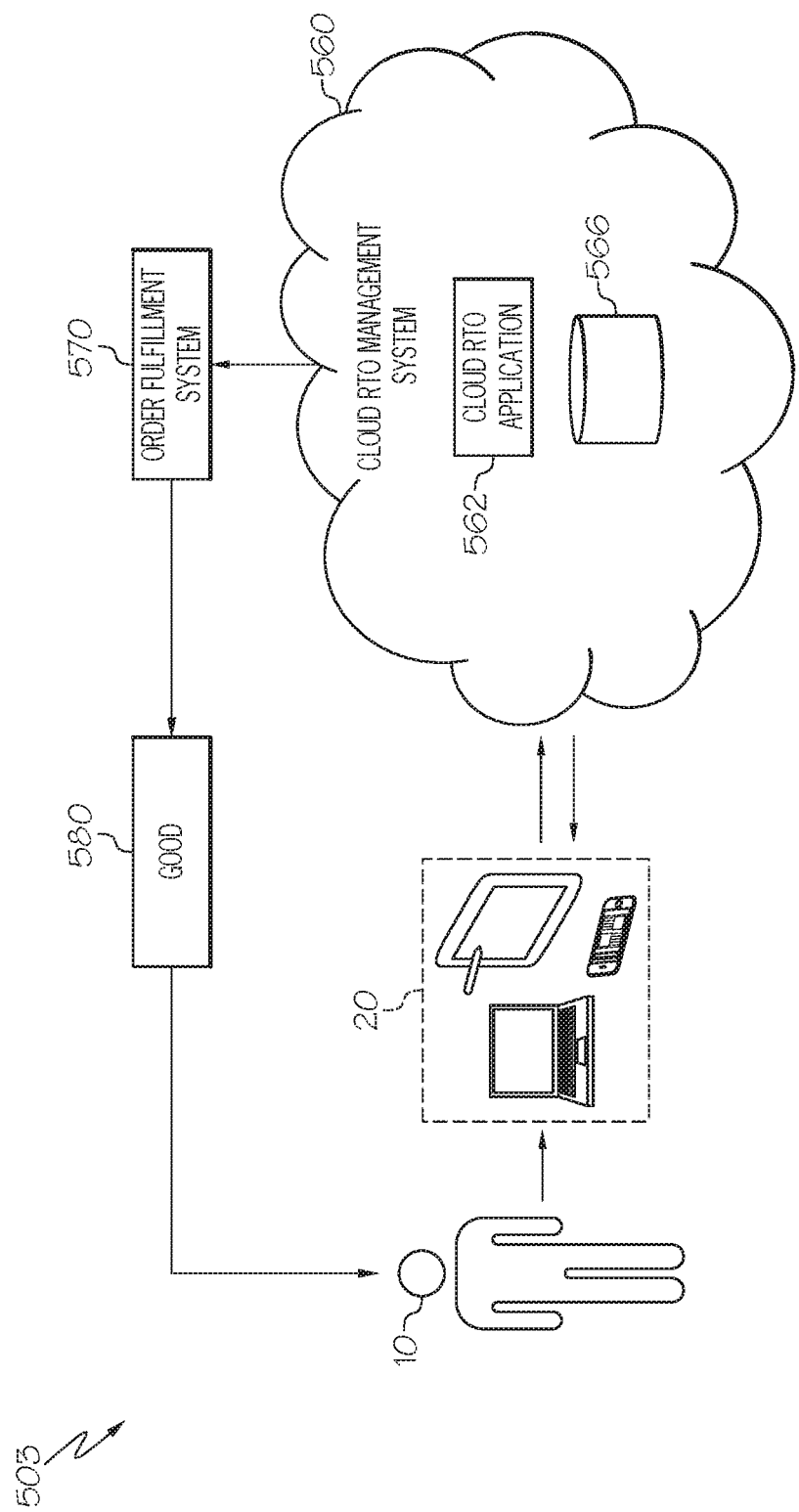
FIG. 10 is a diagram of another embodiment of an environment for facilitating rent-to-own transactions, for example, utilizing cloud computing.

FIG. 10 is a diagram of another embodiment of an environment 503 for facilitating rent-to-own transactions, for example, utilizing cloud computing. As shown generally in FIG. 10, the consumer 10 uses the computer device 20 to access and/or input data. In FIG. 10, the input data is provided to a cloud RTO application 562, for example, via a cloud RTO management system 560. Although only the cloud RTO management system 560 is shown in FIG. 10, the cloud RTO management system 560 may be used in conjunction with the RTO management system 540, for example, as described with respect to FIG. 2 above. For example, the input data may be received by an RTO management application 544 and/or 562. The RTO management system 540 may communicate with the cloud RTO management system 560 via the Internet and/or another suitable network. As shown, the cloud RTO management system 560 comprises the cloud RTO management application 562 and a database 566, which may comprise data describing RTO transactions.

The consumer 10 selects a good 580 for an RTO transaction, for example, as described herein. In some embodiments, the consumer 10 may place an order for the good 580 using the computer device 20. The order may be placed through an e-commerce website or platform, similar to 50 described above in FIGS. 1 and 2. Alternately, the consumer 10 may place the order via a product UI provided by the RTO management system 540 or cloud RTO management system 560, for example, similar to the UI 43 described with respect to FIG. 4. The cloud RTO management system 560 may communicate the order to an order fulfillment system 570 that may facilitate provision of the good 580 to the consumer 10, for example, by shipping. The cloud RTO management system 560 and/or RTO management system 540 may administer the lease in accordance with a state or federal compliant RTO agreement, for example, as described herein.

Figure 11:
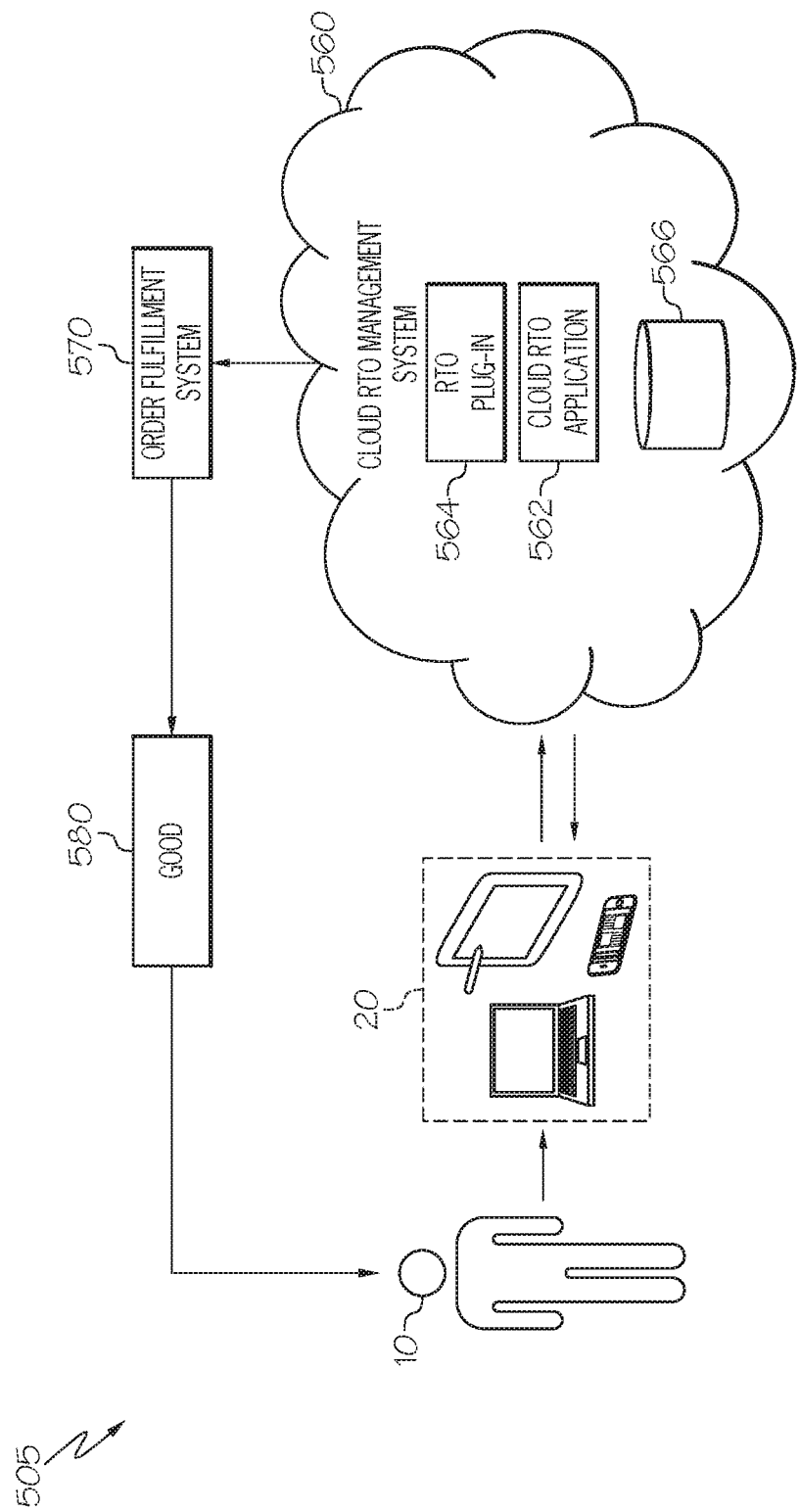
FIG. 11 is a diagram of another embodiment of an environment for facilitating rent-to-own transactions, for example, utilizing cloud computing and a plug-in similar to the plug-in of FIG. 9.

FIG. 11 is a diagram of another embodiment of an environment 505 for facilitating rent-to-own transactions, for example, utilizing cloud computing and a plug-in 564 similar to the plug in 532 of FIG. 9. For example, the plug-in 564 may allow the cloud RTO management system 560 to interact with retail e-commerce servers, such as 530, to facilitate RTO transactions. The retailer e-commerce server 530 communicates with the RTO management system 530 and/or cloud RTO management system 560. In addition to the plug-in 564, the cloud RTO management system 560 comprises a database 566 and the RTO management application 562.

Figure 12:
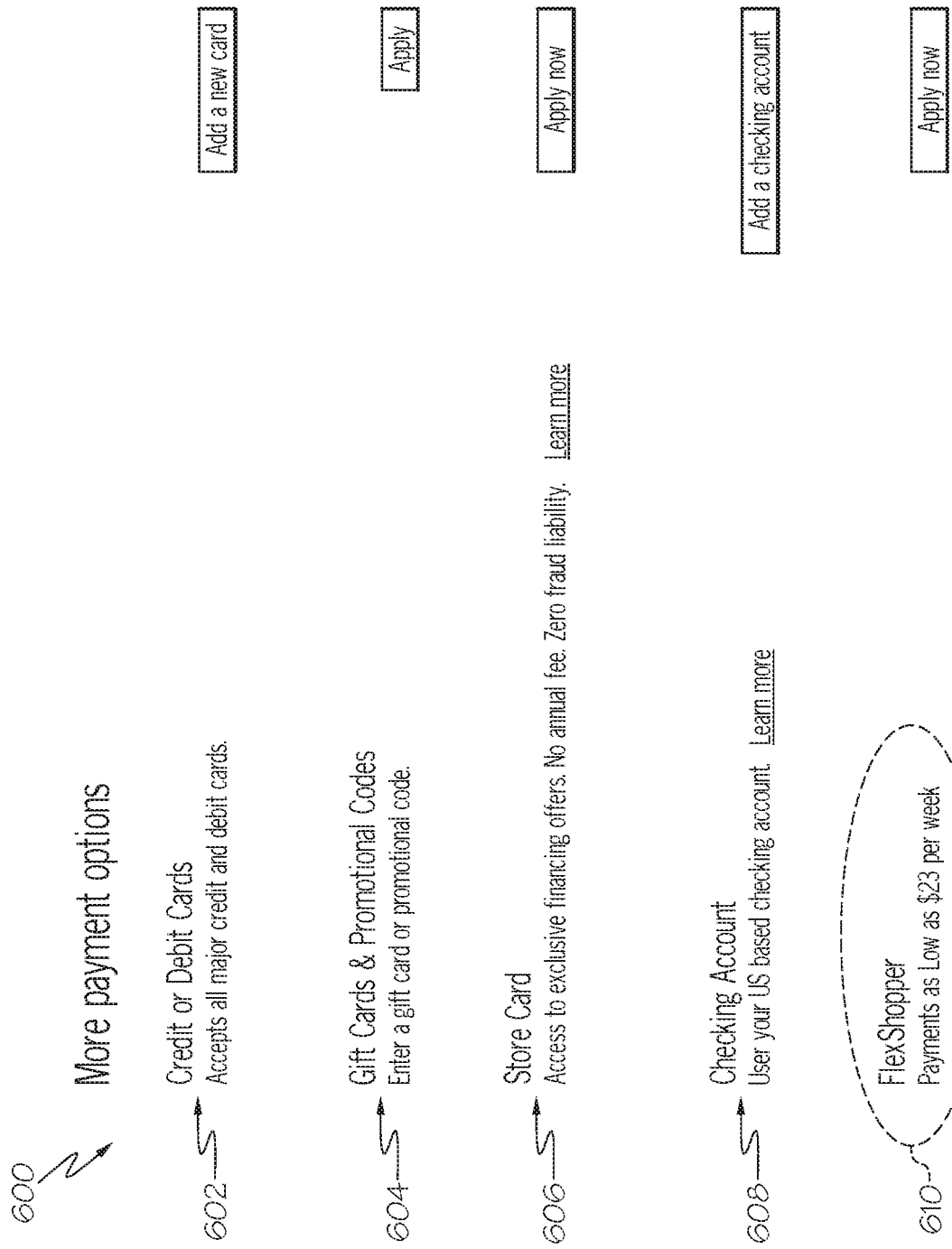

FIG. 12 is a screen shot showing one embodiment of a screen 600 that may be displayed to a consumer by a retailer e-commerce server 530 that is running or in communication with an RTO plug-in such as 532 and/or 564. The screen 600 lists payment options for the consumer 10 that has selected a good 580 and wishes to complete the transaction by specifying a payment method. The screen 600 comprises fields that may be selected by the user to indicate several payment methods including, a credit or debit cart field 602, a gift card and promotional code field 604, a retail store credit card field 606, a checking account field 608, and an RTO field 610. The RTO plug-in 532 and/or 564 may provide the e-commerce server 530 with data for populating the RTO field 610. If the consumer 10 selects the RTO field 610, the RTO plug-in 532 and/or 564 may facilitate communications between the consumer 10 and the retailer e-commerce server 530 and/or the RTO management application 544 and/or 562 for consummating an RTO transaction for the good 580, for example, as described herein.

Figure 13:
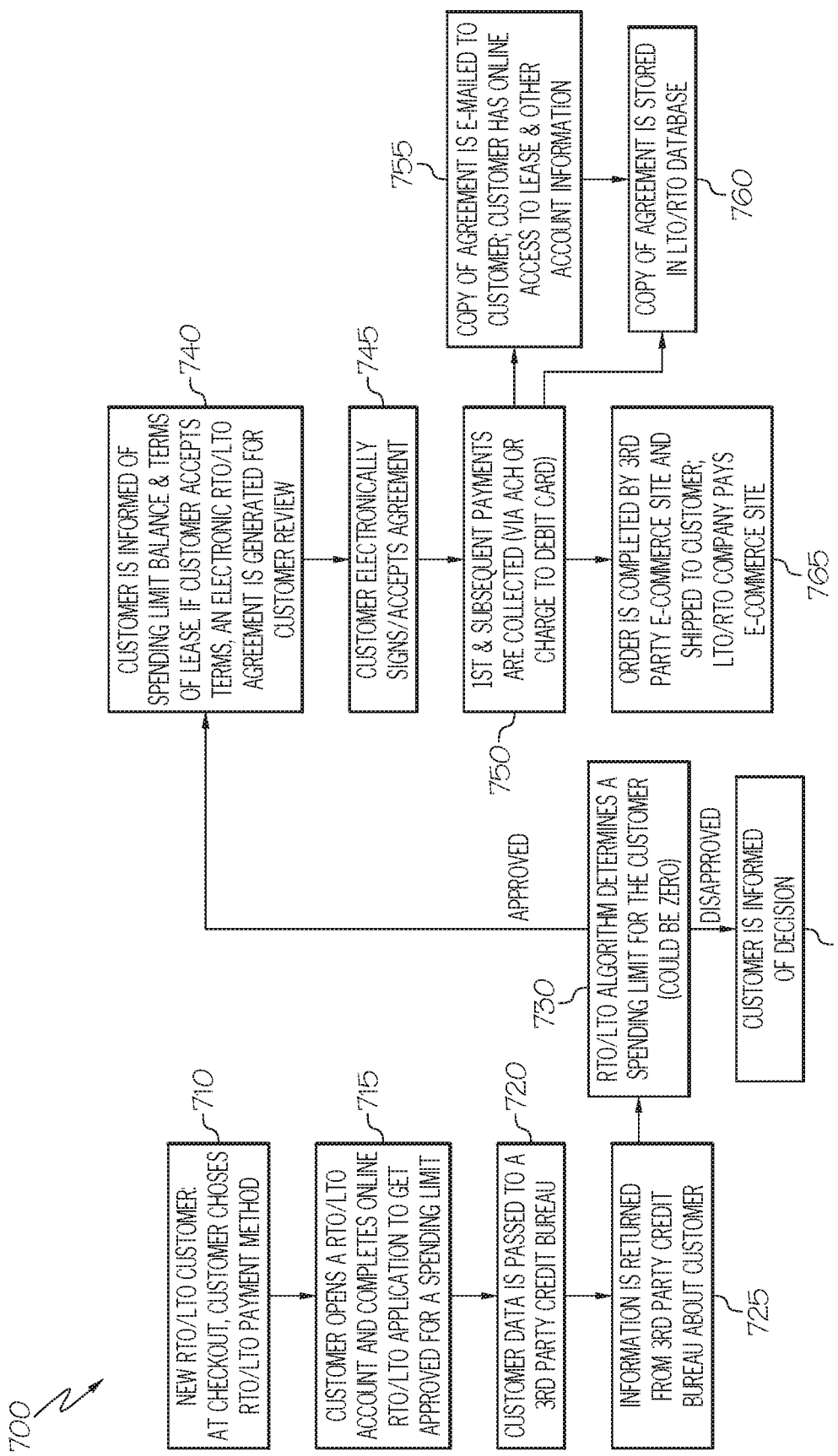
FIG. 13 is a flow chart showing one embodiment of a process flow for using the RTO plug-in for selecting an RTO transaction to pay for a good selected from a retailer e-commerce server.

FIG. 13 is a flow chart showing one embodiment of a process flow 700 for using the RTO plug-in 532 and/or 564 for selecting an RTO transaction to pay for a good 580 purchased from a retailer e-commerce server 530. At 710, a new RTO customer, such as the consumer 10, may select the RTO payment method at checkout on an e-commerce website as payment for a selected good 580. For example, the new RTO customer may select RTO field 610 from the screen 600. When the customer selects the RTO file 610, the plug-in 532 and/or 564 may place the customer in communication with an RTO management application 544 and/or 562. For example, the plug-in 532 and/or 564 may cause an interface for communicating with the RTO management application 544 and/or 562 to be presented through the retailer e-commerce server 503. Also, in some embodiments, the plug-in 532 and/or 564 may open on the customer's computer-based machine 20 an additional interface or window for communicating with the RTO management application 544 and/or 562. At 715, the customer opens an RTO account and completes an online RTO application to become approved for a spending limit. The RTO management application 544 and/or 562 may set the spending limit in any suitable manner including, for example, as described herein above. In some embodiments, input data received through the customer's application may be passed to a third party credit bureau at 720. At 725, the credit bureau may return information about the customer. The spending limit may be set at 730. Communications between the credit bureau and the RTO management application 544 or 562 may be conducted according to an application program interface (API) implemented by the RTO management system 540 and/or 560 or by a server or other computer associated with the credit bureau. In some embodiments, the RTO plug-in 532 and/or 564 executing at the retailer e-commerce server 530 may set the customer's spending limit independent of the RTO management system 540 and/or 560.

If the determined spending limit is less than the price of the selected good 580, the customer may be informed of the decision at 735 and the transaction may terminate. For example, the retailer e-commerce server 530 (e.g., via the RTO plug-in 532) may prompt the customer to select another payment method or a less expensive item. If the determined spending limit is greater than or equal to the price of the selected good 580, then the customer may be informed of the spending limit and provided with terms of the RTO transaction at 740. If the customer approves the terms, an RTO agreement may be generated, by the RTO plug-in 532 and/or 564 and/or by the RTO management application 544 and/or 562 and communicated to the customer via the plug-in. For example, the RTO management application 544 and/or 562 may communicate the spending limit and terms to the RTO plug-in 532 and/or 564, which may provide the information to the customer through the interface provided by the retailer e-commerce server 530. The customer may electronically sign and accepts the agreement at 745. The first payment is accepted typically by ACH at 750. In some embodiments, the first payment is not accepted and/or deducted from the customer's account until after the consumer receives the good. A copy of the agreement such as by .pdf or another electronic document format is emailed to the customer at 755. A copy of the agreement may also be stored in a database of or accessible by the implementing company at 760. At 765, the order is completed by the retailer e-commerce server 530 and the good 580 is shipped or otherwise provided to the customer.

Figure 14:
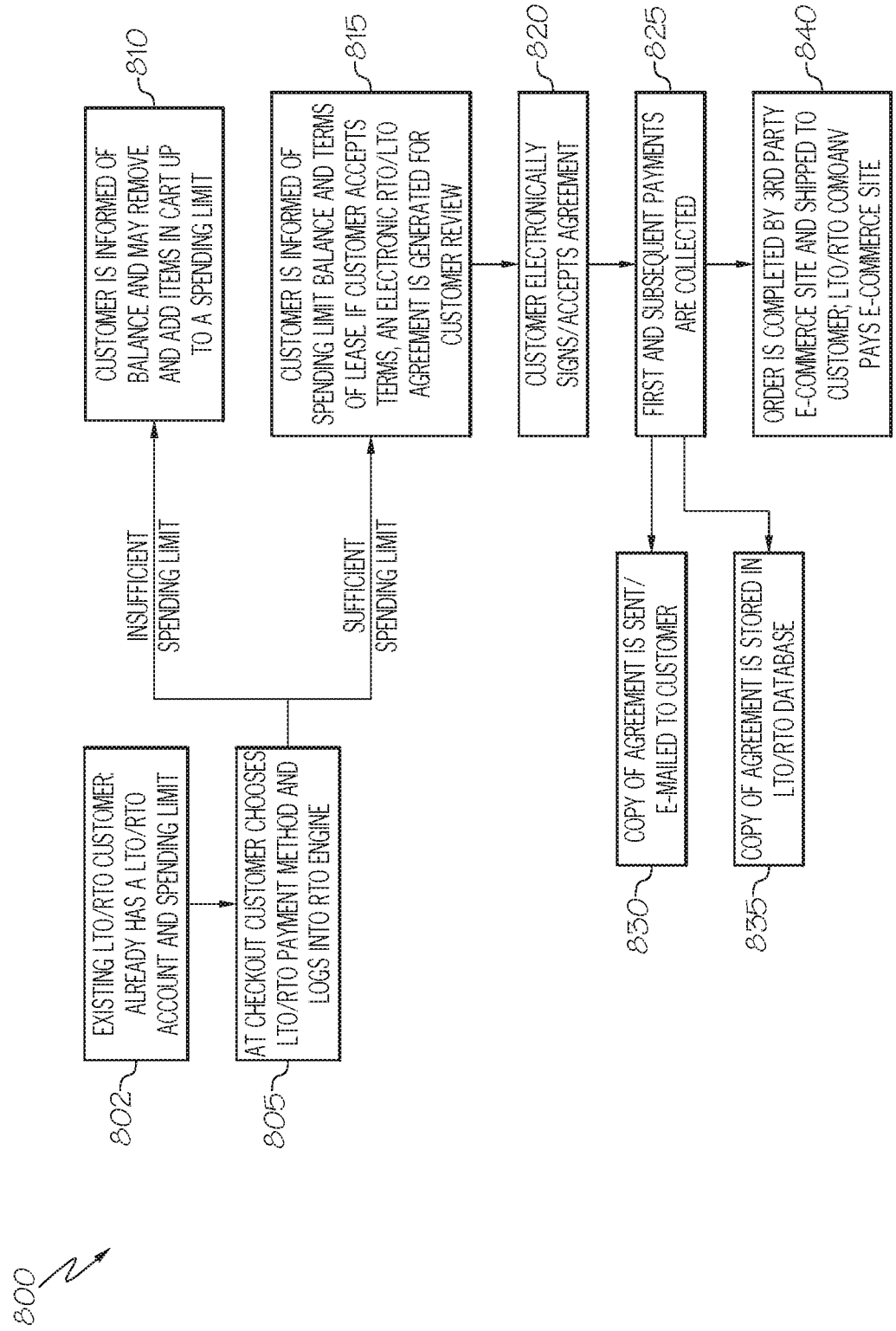
FIG. 14 is a flow chart showing one embodiment of a process flow for using the RTO plug-in for selecting an RTO transaction to pay for a good selected from a retailer e-commerce server by a customer that is already registered with an RTO management system.

FIG. 14 is a flow chart showing one embodiment of a process flow 800 for using the RTO plug-in 532 and/or 564 for selecting an RTO transaction to pay for a good 580 selected from a retailer e-commerce server 530 by a customer that is already registered with an RTO management system. For example, the customer may already have an established account with the RTO management system and a predetermined spending limit (802). At 805, the customer, such as the consumer 10, may select the RTO payment method at checkout on an e-commerce website as payment for a selected good 580. For example, the new RTO customer may select RTO field 610 from the screen 600. The RTO plug-in 532 and/or 564 provide an interface allowing the customer to access the customer's account with the RTO management system, either through an interface provided by the retailer e-commerce server 530 or by a direct connection with the RTO management system. If the customer's spending limit is not equal to the price of the good 580, the customer is informed of the balance, and the customer may remove and add different items to the cart until the spending limit is reached, at 810. If there is a sufficient spending limit balance, the customer is informed of the spending limit balance and terms of the RTO agreement or lease. If the customer accepts the terms, an electronic RTO agreement is generated for customer review, at 815. The customer electronically accepts and signs the RTO agreement at 820. The first payment is accepted typically by ACH, at 825. In some embodiments, the first payment may not be due until after the customer receives the good. A copy of the agreement is emailed to the customer, at 830. Also, a copy of the agreement is stored in a database of or accessible by the RTO company at 835. At 840, the order is completed by the retailer e-commerce server 530, which may cause the good 580 to be shipped or otherwise provided to the customer.

FIGS. 15-42 are screen shots showing embodiments of various user interfaces that maybe provided to the consumer 10 by and/or through the various RTO management systems, e-commerce retail servers, retail stores, etc. The user interfaces may be provided to the consumer 10 via the computer device 20 and/or 60 by any of the various embodiments of the RTO management system and RTO management application described herein including, for example, RTO management system 30 and RTO management application 36, cloud RTO management system 110 and cloud RTO management application 130, RTO management system 540 and RTO management application 544, cloud RTO management system 560 and cloud RTO application 562, etc.

FIGS. 15-23 are screen shots showing embodiments of a user interface 1500 that may be provided to the consumer 10 to register with the RTO management system (e.g., register for an RTO program administered by the RTO management system). FIG. 15 is a screen shot showing one embodiment of a screen 1502 of the user interface 1500. For example, the screen 1502 may be displayed to the consumer 10 to allow the consumer 10 to create an account with the RTO management system. The account may be utilized, as described herein, to allow the consumer to enter RTO transactions for the acquisition of goods. The screen 1502 comprises various fields where the consumer 10 may enter information describing the consumer 10 such as, for example, a first and last name, an e-mail address, and a password. In some embodiments, the consumer 10 may continue the application process by selecting the Continue button. In some embodiments, the screen 1502 also comprises a Log in button. For example, the consumer 10 may select the Log in button if the consumer already has an active account.

FIG. 16 is a screen shot showing one embodiment of another screen 1504 of the user interface 1500 that may be provided to the consumer 10 to receive additional information about the consumer 10. The screen 1504 may comprise fields where the consumer 10 may enter his or her address, one or more telephone numbers (e.g., a home number and/or a mobile number), employer information, a social security number or other identifying information, a gender and a date of birth. In some embodiments, the screen 1504 may comprise one or more check fields 1506. The screen 1504 may require that the consumer 10 read and assent to the listed statements by checking the associated box or boxes. When the consumer 10 has read and indicated that the assent to the associated statements, the user may select the Continue button to move to the next screen.

FIG. 17 is a screen shot showing one embodiment of another screen 1508 of the user interface 1500 that may be provided to the consumer 10 to receive information about a payment method. The screen 1508 comprises a payment field 1510 from which the consumer 10 may select a payment method. As described herein, the payment method may be used to receive periodic payments due under any RTO agreements that the consumer 10 may enter. Also, as described herein, the payment method (e.g., the consumer's history associated with the payment method) may be used to determine the spending limit for the consumer 10 and/or to receive periodic payments due under any RTO agreements that the consumer 10 may enter. The payment field 1510 comprises two options, Debit Card and Bank Account, although other payment options may be included. In the embodiment of FIG. 17, the Debit Cart option is selected and the payment field 1510 comprises fields for receiving information describing the consumers debit card for use as a payment method. FIG. 18 is a screen shot showing one embodiment of the payment field 1510 with the Bank Account option selected. As shown in FIG. 18, the payment field 1510 comprises fields for receiving information describing the customer's bank account for use as a payment method. When the consumer 10 has completed the appropriate fields in the screen 1508, the user may select the Continue button to move to the next step.

FIG. 19 is a screen shot showing one embodiment of another screen 1512 of the user interface 1500 that may be provided to the consumer 10 to receive additional information about the consumer's financial history. For example, the screen 1512 may prompt the consumer 10 to provide information regarding the account where the consumer 10 receives his or her paycheck. This may be used, for example, as described above with respect to FIG. 6, to determine a spending limit for the consumer. In screen 1512, fields indicating the consumer's name may be pre-populated, for example, based on information previously provided through other screens. Additional fields may receive the name of the bank or card where the consumer 10 receives his or her paycheck, an account type (e.g., checking, savings, etc.), an indication of when the user receives his or her paycheck (weekly, bi-weekly, monthly, etc.), and an amount of each paycheck. The user may confirm that he or she has read the terms and conditions of the account by checking the associated box and move to the next step of the application process by selecting the Next button.

Figure 22:
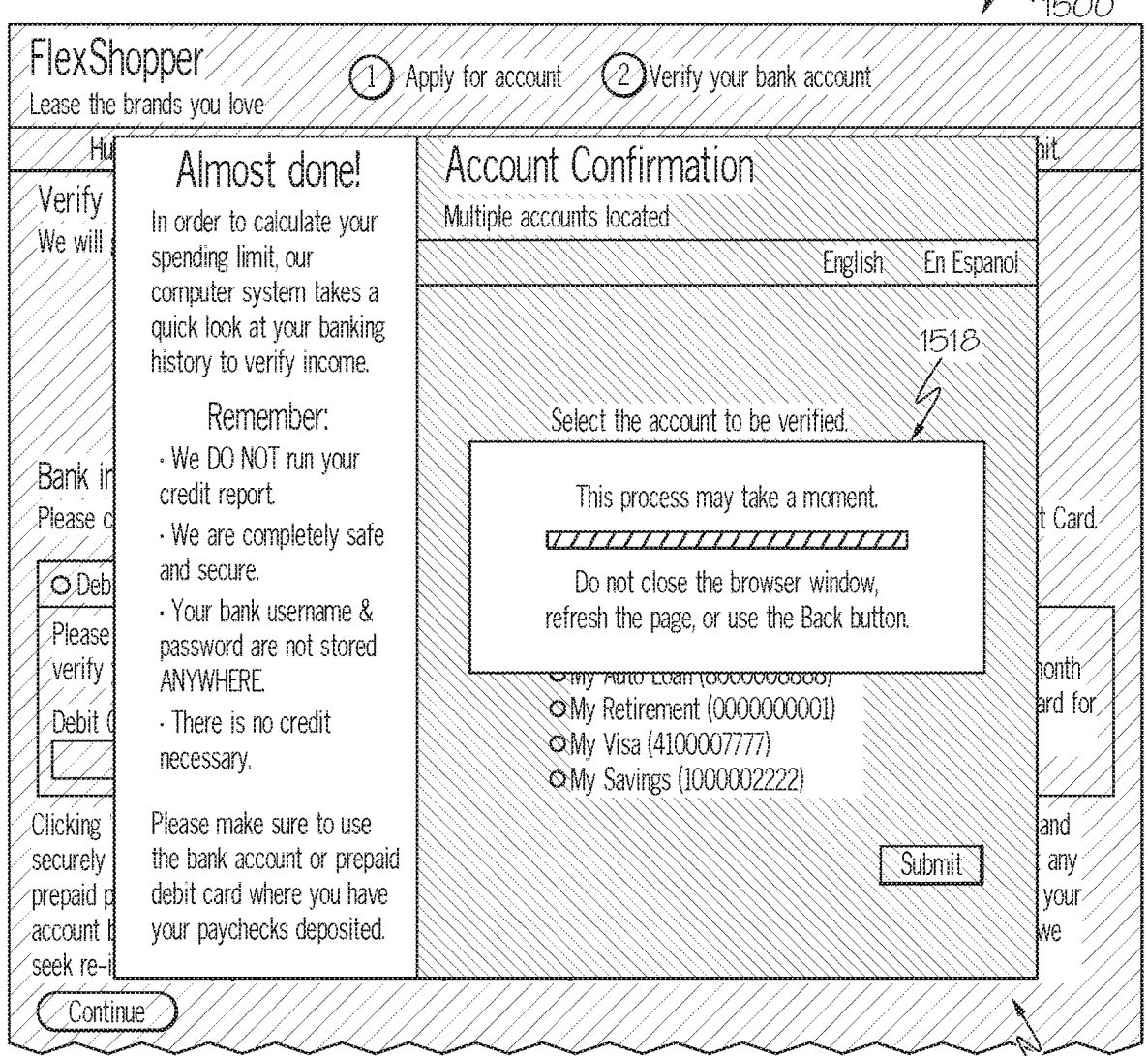
Figure 23:
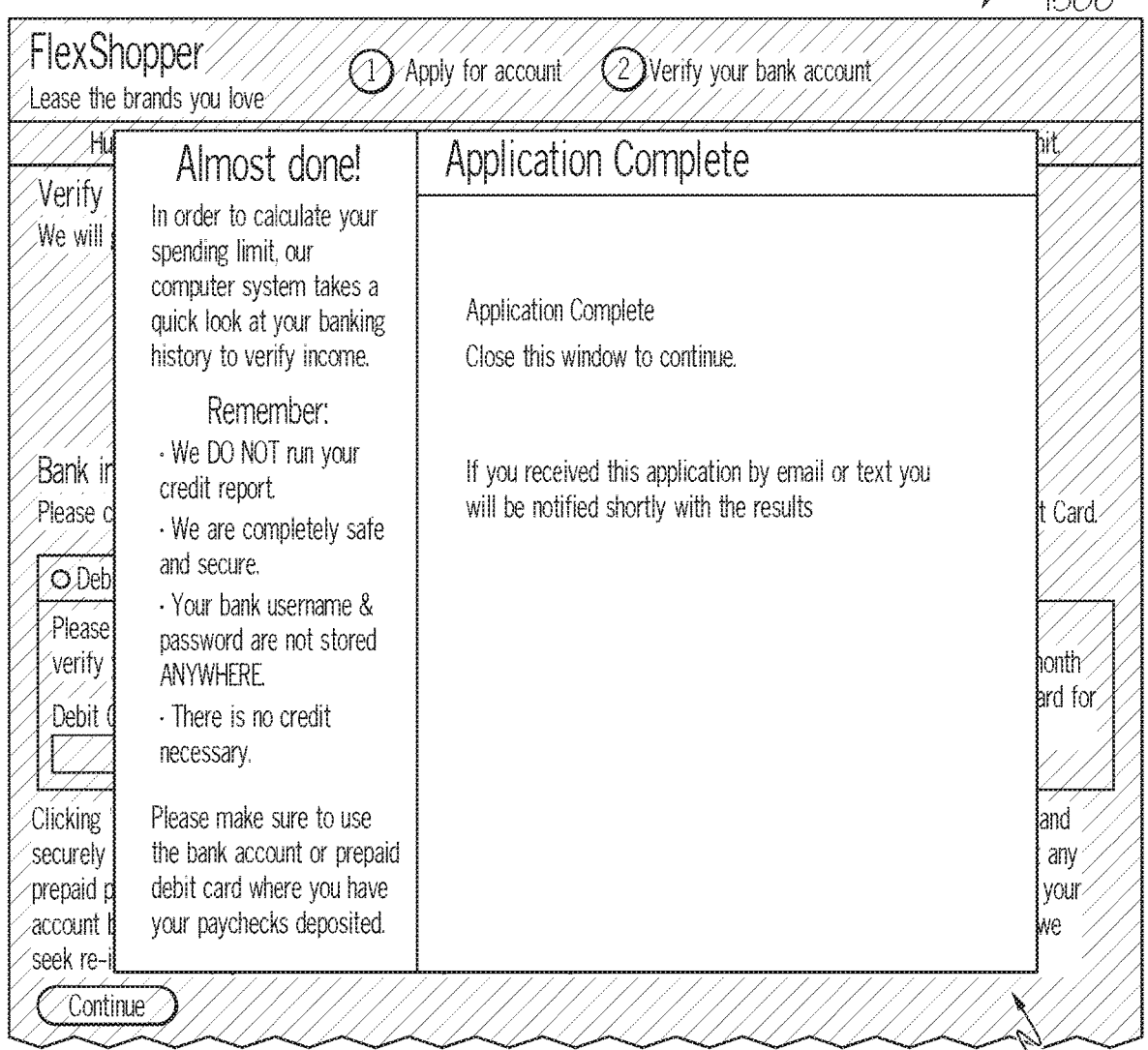

FIG. 20 is a screen shot showing one embodiment of another screen 1514 of the user interface 1500 that may be provided to the consumer 10 to receive additional information about the consumer's financial history. For example, the screen 1514 may comprise fields for receiving the consumer's user identification and password for accessing the financial institution at which the account entered at the screen 1512 is held. When this information is entered, the consumer 10 may select the Submit button. In some embodiments, for example, when the consumer 10 has more than one account at the financial institution, the consumer 10 may be shown an additional screen 1516 (FIG. 21) with a list of the consumer's accounts at the institution. The consumer 10 may select the account to be verified and press the Submit button. The RTO management system may then query the financial institution to receive the consumer's bank activity, for example, as described herein. In some embodiments, while the query is taking place, the consumer 10 may be shown a wait field 1518, as shown in FIG. 22. Optionally, when the query is complete, the consumer 10 may be shown a completion screen 1520, as shown in FIG. 23

Figure 24:

FIGS. 24-26 are screen shots showing embodiments of screens from the user interface 1500 that may be shown to the consumer 10 during the application process to inform the consumer 10 of the consumer's spending limit. FIG. 24 shows one embodiment of a screen 1522 that may be shown to a consumer 10 that has been approved by the RTO management system (e.g., a consumer with a non-zero spending limit). The screen 1522 may indicate to the consumer 10 that the consumer 10 is approved. It may also include information identifying the consumer 10 and an indication of the spending limit. In some embodiments, as shown in FIG. 24, the screen 1522 may also include, an indication of the monthly or other periodic payment if the entire spending limit is used and an indication of any portion of the spending limit that has already been used. FIG. 25 shows one embodiment of a screen 1524 that may be shown to a consumer 10 that has been declined for a spending limit. The screen 1524 indicates that no spending limit has been assigned. In some embodiments, the RTO management system may need additional information to determine whether the consumer 10 qualifies for a non-zero spending limit. For example, a representative of the implementing company may manually contact the consumer 10 and/or a representative of the consumer's financial institution before assigning a spending limit. This may be necessary, for example, if the RTO management system is not able to access the consumer's financial data. FIG. 26 is a screen shot showing one embodiment of a screen 1524 that may be shown to the consumer 10 when the implementing company needs to gather additional information.

Figure 27:
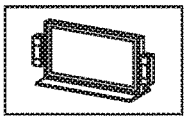
Figure 29:
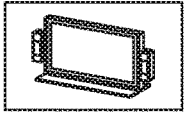

FIGS. 27-29 are screen shots showing embodiments of a user interface 2700 that may be provided to the consumer 10 that has selected a good through a product interface, such as the UI 43 provided by the RTO management system. FIG. 27 is a screen shot showing one embodiment of a summary screen 2702 of the interface 2700 that may be displayed to a consumer 10 that has been approved for an RTO transaction on a good. For example, the consumer 10 may have selected the good from the UI 43 shown in FIG. 4. Referring to FIG. 5, the screen 2702 may be shown to the consumer 10, for example, at 328. The screen 2702 may indicate, information identifying the consumer 10, an indication of the selected good, an indication of the procurement method (e.g., different shipping options in FIG. 27), and a price of the good. The screen 2702 may also show a periodic payment on the RTO transaction (e.g., a weekly payment) along with an available spending limit.

The consumer 10 may review the information at the screen 2702 and may select a Review your lease button to look at the specific terms of the RTO transaction. FIG. 28 is a screen shot showing one embodiment of an RTO terms screen 2704 displaying the terms of an RTO transaction. The consumer 10 may review the terms and indicate acceptance by checking the box 2706. In various embodiments, the RTO management system may be configured to allow the consumer 10 to check the box 2706, or otherwise indicate acceptance of the RTO transaction terms, only after the user has viewed all of the terms of the RTO transaction. For example, the RTO management system may not allow the consumer 10 to select the box 2706 until the consumer 10 has scrolled through all of the terms, as indicated by scroll control 2708. FIG. 29 shows one embodiment of a screen 2708 that may be shown to the consumer 10 after the consumer 10 has accepted the terms of the RTO transaction. The screen 2708 may indicate, for example, information identifying the consumer 10, an indication of the selected good, an indication of the transaction price, an indication of the periodic (e.g., weekly) payment. In some embodiments, the screen 2708 also indicates the consumer's total spending limit, an indication of an amount of the spending limit (if any) that remains, and an additional periodic payment that would be due if the remainder of the spending limit was used.

FIGS. 30-33 are screen shots showing embodiments of a user interface 3000 that may be provided to the consumer 10 that has selected goods at a retail store, for example, as described herein with respect to FIGS. 1-3. For example, the user interface 3000 may be provided to the consumer 10 via the mobile device 60 described herein above. The user interface 3000 may be provided to a consumer 10 that has applied with the RTO management system, for example, as described with respect to the interface 1500, either prior to or during a transaction. FIG. 30 is a screen shot showing one embodiment of a screen 3002 that may be displayed to the consumer 10 to indicate goods from a retail store that may be subject to an RTO transaction. The screen 3002 may comprise a product field 3004 listing goods that the consumer 10 would like to acquire with an RTO transaction. Information regarding the goods may be entered into the field 3004 in any suitable manner. For example, the consumer 10 may manually complete the field 3004. Also, in some embodiments, a sales associate at the retail store may complete the field. For example, the sales associate may utilize a scanner to scan a card or physical example of the good. The scanner may be directly or indirectly in communication with the consumer's mobile device 60 to provide the information to the interface 3000. In some embodiments, the screen 3002 may also indicate a total price of the selected goods, as well as the consumer's spending limit, and a balance available to spend. An Add more items button may be selected, by the consumer 10 and/or the sales associate, to add additional items to the field 3004 (for example, if the customer 10 has additional room under his or her spending limit.) A Submit items button may be selected to advance the transaction.

FIG. 31 is a screen shot showing one embodiment of a screen 3006 of the user interface 3000 that may be shown to the user 10 after the user has submitted goods for an RTO transaction. The screen 3006 may comprise information describing the consumer 10, as well as an indication of the goods that will be subjects of the RTO transaction. The screen 3006 may also show a price of the selected goods, the consumer's spending limit, and a balance, if any, of the spending limit that is available for additional goods or transactions. The consumer 10 may add another good to the transaction by selecting the Add more items button, or may advance the transaction by selecting the Review your lease button. FIG. 32 is a screen shot showing one embodiment of an RTO terms screen 3008 displaying the terms of an RTO transaction. The consumer 10 may review the terms and indicate acceptance by checking the box 3012. In various embodiments, the RTO management system may be configured to allow the consumer 10 to check the box 3012, or otherwise indicate acceptance of the RTO transaction terms, only after the user has viewed all of the terms of the RTO transaction. For example, the RTO management system may not allow the consumer 10 to select the box 3012 until the consumer 10 has scrolled through all of the terms, as indicated by scroll control 3010.

FIG. 33 is a screen shot showing one embodiment of a screen 3014 of the interface 3000 that may be shown to the consumer 10 after the consumer 10 has accepted the terms of an RTO transaction. The screen 3014 may indicate, for example, information identifying the consumer 10, an indication of the selected good, an indication of the transaction price, an indication of the periodic (e.g., weekly) payment. In some embodiments, the screen 3014 also indicates the consumer's total spending limit, an indication of an amount of the spending limit (if any) that remains, and an additional periodic payment that would be due if the remainder of the spending limit was used.

Figure 34:
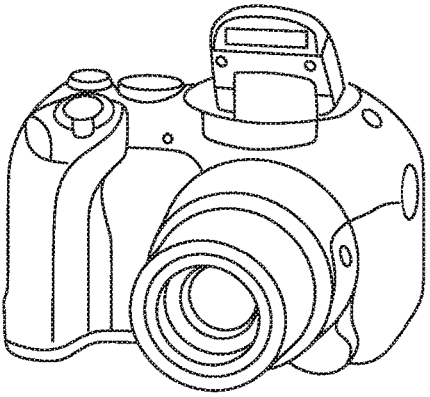
Figure 35:
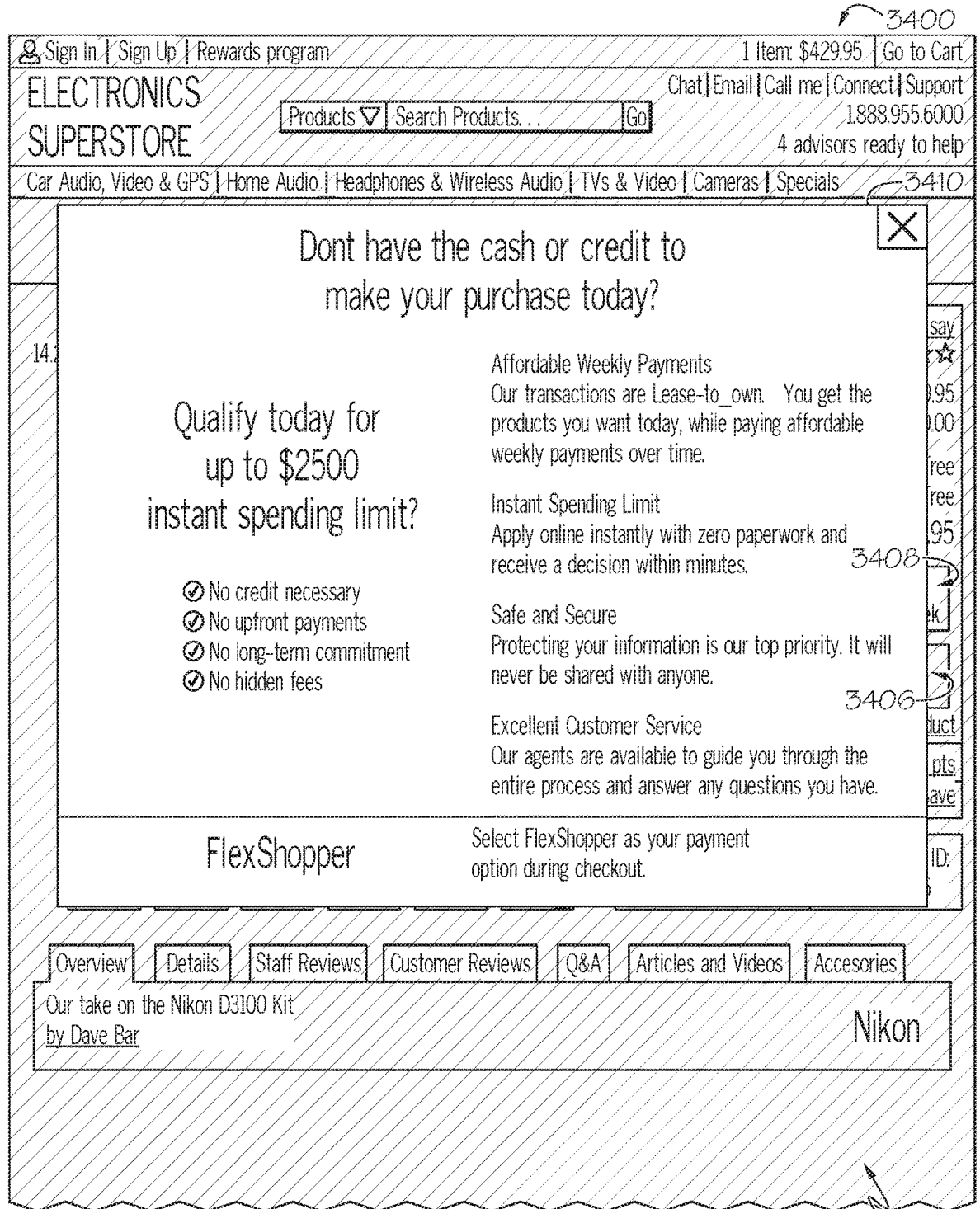

FIGS. 34-42 are screen shots showing embodiments of a user interface 3400 that may be provided to the consumer 10 that utilizes an RTO plug-in, as described herein to use an RTO transaction to acquire goods through an e-commerce website. FIG. 34 is a screen shot showing one embodiment of a screen 3402 that may be provided to the consumer 10 (e.g., a computer device 20 or 60 thereof) by an e-commerce website implemented on a retail e-commerce server 530 executing an RTO plug-in, such as 532. The screen 3402 shows various information about a good including, for example, photos, descriptions, customer reviews, a price, etc. The screen also includes an Add to cart button 3406. The customer 10 may select the Add to cart button to add the illustrated good to a list of products to be purchased, or otherwise acquired, by the consumer. An RTO transaction field 3408 may be selected by the consumer 10 to acquire the indicated good using an RTO transaction, or may simply provide the consumer 10 with additional information about the option of an RTO transaction when the consumer 10 selects the field 3408, for example, by mover the cursor over it (e.g., "mousing over"). For example, when the consumer 10 selects the field 3408, the screen 3402 may display an RTO information field 3410 providing additional information about potential RTO transactions. The RTO transaction field 3408 and/or RTO information field 3410 may be provided and/or populated, for example, by the RTO management system through the RTO plug-in.

Figure 36:

FIG. 36 is a screen shot showing one embodiment of a transaction summary screen 3404 of the interface 3400 that may be shown to the consumer 10 when the consumer 10 has selected goods to be purchased or acquired. For example, the screen 3400 may comprise a goods field 3412 indicating the consumer-selected goods. A checkout field 3414 may summarize the price and shipping options for the selected goods. The consumer may select a Secure Checkout button 3416 to advance the transaction. FIG. 37 is a screen shot showing one embodiment of a transaction completion screen 3420 of the interface 3400 that may be shown to the consumer 10 when the consumer has proceeded "to checkout" at the e-commerce website. The screen 3420 may comprise an indication of the selected goods. A payment option field 3422 may indicate ways that the consumer 10 may pay for the selected goods. The payment option field 3422 comprise various selectable entry for other payment methods including credit cards, transaction credit, online payment systems, and others. An RTO transaction entry 3426 may be selected to complete the acquisition of the selected goods with an RTO transaction. In some embodiments, when the RTO transaction entry 3426 is selected, additional information about a potential RTO transaction is shown at field 3424 including, for example, an estimated periodic payment. The RTO transaction entry 3426 and field 3424 may be provided to the retail e-commerce server 530, for example, from the RTO management system from the RTO plug-in.

Figure 39:
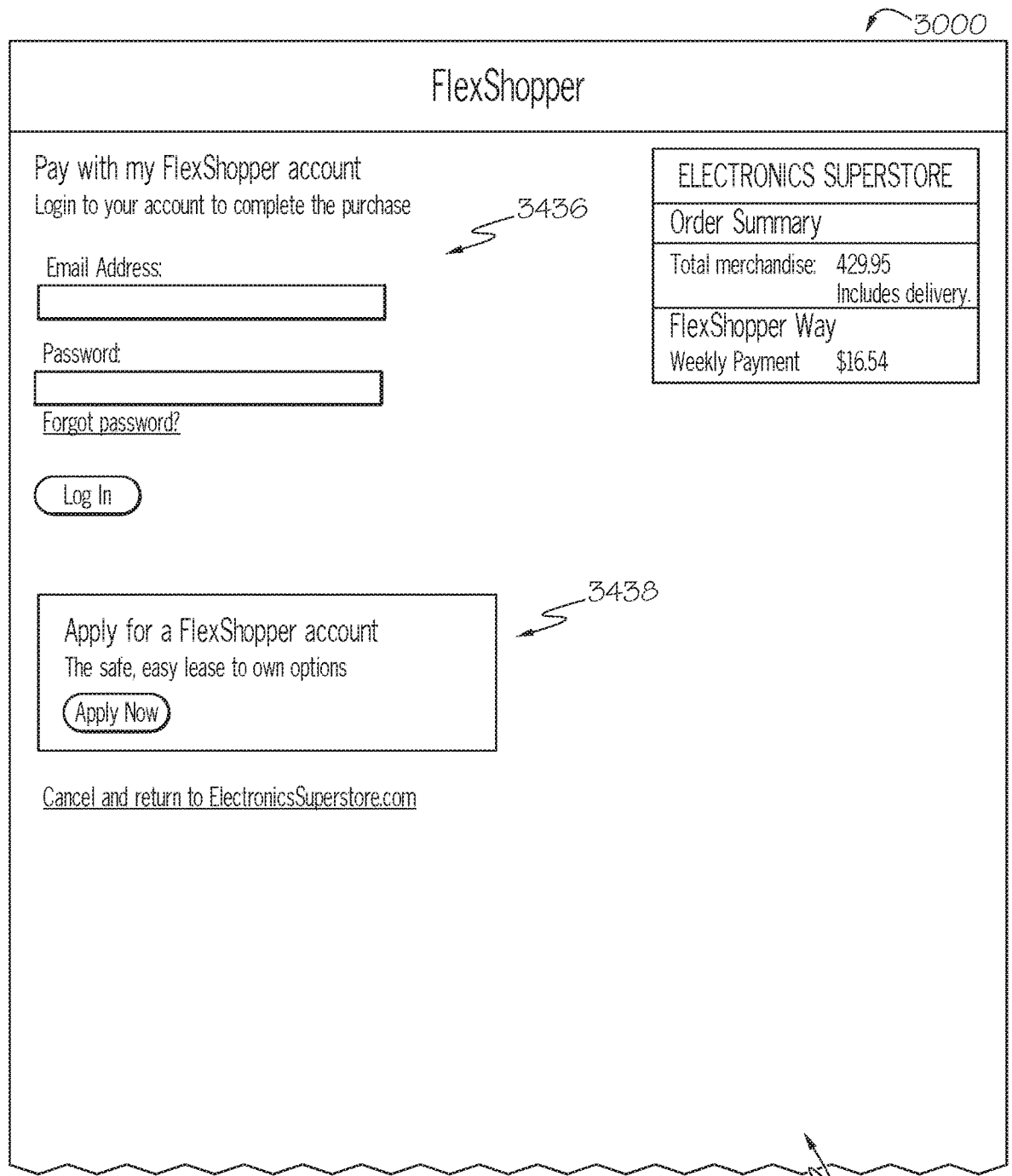

FIG. 38 is a screen shot showing one embodiment of a transaction summary screen 3430 of the interface 3400 that may be shown to a consumer 10 to complete a transaction. For example, the screen 3430 may comprise a summary of the proposed transaction including, for example, information identifying the consumer 10, information indicating the fulfillment (e.g., shipping), and the selected payment method. In FIG. 38, the selected payment method is an RTO transaction. The consumer 10 may advance the transaction by selecting an RTO payment button 3432, labeled "Pay with FlexShopper" in FIG. 38. FIG. 39 is a screen shot showing one embodiment of a RTO transaction screen 3434 that may be shown to the consumer 10, for example, after RTO transaction is selected as a payment method for the selected goods (e.g., after the RTO payment button 3432 is selected. The screen 3434 comprises an Order Summary field that indicates the total cost of the selected goods and an estimated periodic payment for the goods in an RTO transaction. The screen also comprises an RTO log-in field 3436. Consumers 10 who already have an account and/or a spending limit with the RTO management system may enter their log-in information into this field and select the Log-In button to log-in to the RTO management system through the RTO plug-in and continue the transaction. The screen 3434 may also comprise an application field 3438. Consumers 10 who do not have active accounts and/or current spending limits with the RTO management system may select this field. Upon selection of the application field 3438, and the provision of requested information, the RTO management system may operate, for example, as described herein with respect to FIGS. 15-23. In various embodiments, the screen 3434 may be provided by the retail e-commerce server 530 from the RTO management system through the RTO plug-in.

FIG. 40 is a screen shot showing one embodiment of an approval screen 3440 of the interface 300 that may be shown to the consumer 10 if the consumer is approved for a spending limit equal to or greater than the cost of the selected goods. If the consumer 10 has an account with the RTO management system and a high enough previously determined spending limit, then the approval screen 3440 may be displayed after the consumer 10 logs-in to the RTO management system at the field 3436 (e.g., FIG. 39). If the consumer 10 must either establish an account and/or a spending limit, the screen 3440 may be shown to the consumer 10 after these things are completed. The screen 3440 may comprise information indicating the consumer 10 including, for example, a home address and a shipping address. The screen may also indicate the selected good or goods, the total price of the transaction, and a periodic payment. In some embodiments, the consumer's spending limit, available limit and periodic payment if the entire limit is used are also listed. The consumer 10 may advance the transaction by selecting the Review your lease button.

FIG. 41 is a screen shot showing one embodiment of an RTO terms screen 3442 displaying the terms of an RTO transaction. The screen 3442 may be shown to the consumer 10 after the consumer selects the Review your lease button from FIG. 40. The consumer 10 may review the terms and indicate acceptance by checking the box 3446. In various embodiments, the RTO management system may be configured to allow the consumer 10 to check the box 3446, or otherwise indicate acceptance of the RTO transaction terms, only after the user has viewed all of the terms of the RTO transaction. For example, the RTO management system may not allow the consumer 10 to select the box 3446 until the consumer 10 has scrolled through all of the terms, as indicated by scroll control 3444. FIG. 42 is a screen shot showing one embodiment of a transaction confirmation screen 3450 of the interface 3000 that may be shown to the consumer 10 after the consumer 10 has completed the RTO transaction by approving the RTO transaction terms, for example, as shown in FIG. 41.

Among the benefits associated with the current disclosure are: easy online access to an RTO program; a consumer does not have to go to an RTO store making RTO accessible to more people; freedom of choice because a consumer has access to name-brand products at major retailers and is not limited to RTO store products.

Among the benefits associated with the current disclosure are increased sales for retailers and e-tailers from consumers with no cash or credit but with access to web-based RTO program.

The depicted architectures for the computer system and system environment are merely examples and that many other architectures can be implemented which achieve the same functionality.

The foregoing detailed description has set forth various aspects of the present disclosure via the use of block diagrams, flow charts, and examples. It will be understood by those in the art that each feature (e.g., block diagram component, process flow action, operation and/or component, etc.) illustrated by the use of examples can be implemented, individually and/or collectively, by a wide range of hardware, software, firmware, or any combination thereof. For example, it is envisioned that, in practice, any feature described with respect to one of the diagrams and/or process flows described herein may be incorporated into other embodiments.

The present disclosure has been described in the context of a fully functional computer system, however, those skilled in the art will appreciate that the present disclosure is capable of being implemented in a variety of forms.

The above discussed embodiments include software modules that perform certain tasks. The software modules discussed herein may include script, batch or other executable files. The software modules may be stored on a machine-readable or computer readable storage medium such as a disk drive. Storage devices used for storing software modules in accordance with the present disclosure include, but are not limited to, floppy disks, hard disks, and optical disks. The modules may be stored within a computer system memory to configure the computer system to perform the functions of the module. Other types of computer-readable storage media may be used to store the modules discussed herein.

It will therefore be readily understood by those persons skilled in the art that the present disclosure is susceptible of broad utility and application. Many embodiments and adaptations of the present disclosure other than those herein described, as well as many variations, modifications and equivalent arrangements, will be apparent from or reasonably suggested by the present disclosure and the foregoing description thereof, without departing from the substance or scope of the present disclosure. Accordingly, while the present disclosure has been described herein in detail in relation to its preferred embodiment, it is to be understood that this disclosure is only illustrative and exemplary of the present disclosure and is made merely for purposes of providing a full and enabling disclosure of the disclosure. The foregoing disclosure is not intended or to be construed to limit the present disclosure or otherwise to exclude any such other embodiments, adaptations, variations, modifications and equivalent arrangements.

One of ordinary skill in the art will recognize that each step of the Figures may be implemented by computer instructions or by one or more software modules executable on the computer system described. The RTO plug-in may comprise one or more software modules that perform certain tasks. The software modules comprise automated decision rules and computer-implemented algorithms which are used to, for example, perform various steps in the computer-implemented method of the present invention.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is, in turn, connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc.), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention.

What is claimed is:

1. A system, comprising:
    an e-commerce server configured for electronic communication, via a network, with a consumer device; and
    a rent-to-own (RTO) system comprising a RTO management application, the e-commerce server further configured for electronic communication, via the network, with the RTO system,
    wherein the e-commerce server comprises:

an e-commerce application configured to provide, via the network, an e-commerce website to the consumer device, wherein the e-commerce website comprises a plurality of e-commerce user interfaces including an e-commerce user interface associated with a good, wherein the e-commerce user interface associated with the good includes information corresponding to the good; and a RTO plug-in integrated with the e-commerce application to facilitate a RTO transaction through the e-commerce website, wherein the RTO plug-in is executable by the e-commerce server to:
integrate a RTO control element in the e-commerce user interface associated with the good, wherein the RTO control element is selectable to acquire the good using the RTO transaction; and
after selection of the RTO control element, provide to the consumer device, via the network, one or more than one RTO user interface received from the RTO management application, to facilitate completion of the RTO transaction through the e-commerce web site, and wherein the RTO management application is configured to provide a plurality of RTO user interfaces including the one or more than one RTO user interface to the e-commerce server.

2. The system of claim 1, wherein the RTO plug-in is executable by the e-commerce server to:
provide to the consumer device, via the network, a RTO user interface received from the RTO management application, wherein the RTO user interface comprises:
RTO terms for the RTO transaction, wherein the RTO terms comprise a periodic payment due and a duration under the RTO transaction for the good; and
at least one user interface element selectable to indicate electronic acceptance of the RTO terms.

3. The system of claim 2, wherein the e-commerce application is configured to:
after a selection of the at least one user interface element, provide to the consumer device, via the network, an e-commerce user interface that indicates the RTO transaction as complete.

4. The system of claim 1, wherein the RTO plug-in is executable by the e-commerce server to:
provide to the consumer device, via the network:
a first RTO user interface received from the RTO management application, wherein the first RTO user interface requests data associated with the consumer; and
a second RTO user interface received from the RTO management application, wherein the second RTO user interface indicates a spending limit determined by the RTO management application based on the data associated with the consumer.

5. The system of claim 4, wherein the second RTO user interface further indicates a balance of the spending limit available to spend.

6. The system of claim 1, wherein the e-commerce user interface associated with the good further comprises:
a control element selectable to add the good to a list of at least one good to be acquired.

7. The system of claim 1,
wherein the RTO control element is further selectable to:
provide information associated with the RTO transaction as a payment option for the good; or
initiate the RTO transaction to acquire the good after the RTO management application has determined, based on the information corresponding to the good, that the good is a transaction eligible good.

8. The system of claim 7, wherein the RTO plug-in is executable by the e-commerce server to:
populate the RTO control element, in the e-commerce user interface associated with the good, with a periodic payment after the RTO management application has determined, based on the information corresponding to the good, the periodic payment associated with the transaction eligible good.

9. The system of claim 1, wherein the RTO plug-in is executable by the e-commerce server to:
provide to the consumer device, via the network, a RTO user interface received from the RTO management application, wherein the RTO user interface comprises:
RTO terms for the RTO transaction, wherein the RTO terms comprise a periodic payment due and a duration under the RTO transaction for the good; and
at least one user interface element selectable to indicate electronic acceptance of the RTO terms; and
wherein the RTO management application is further configured to, after receipt of the electronic acceptance of the RTO terms, purchase the good and arrange delivery of the good.

10. The system of claim 1, wherein the RTO system is implemented via a RTO computer, via a RTO server, or via a computer of a cloud computing network.

11. The system of claim 1, wherein the e-commerce server is operated by a retailer not associated with a company operating the RTO system.

12. The system of claim 1, wherein the e-commerce server comprises a plurality of e-commerce servers, wherein each e-commerce server comprises the RTO plug-in, and wherein each RTO plug-in is executable by each respective e-commerce server to facilitate a RTO transaction through a respective e-commerce website provided by each respective e-commerce server.

13. The system of claim 1, wherein the plurality of e-commerce user interfaces further includes a checkout interface, and wherein the RTO plug-in is further executable by the e-commerce server to:
integrate a RTO control element in the checkout interface, wherein the RTO control element is selectable to initiate the RTO transaction as a payment option for the good.

14. A system, comprising:
an e-commerce server configured to communicate with a rent-to-own (RTO) management application and a consumer device, wherein the e-commerce server comprises:
an e-commerce application configured to provide an e-commerce web site to the consumer device, wherein the e-commerce website comprises a plurality of e-commerce user interfaces including a checkout interface; and
a RTO plug-in integrated with the e-commerce application to facilitate a RTO transaction through the e-commerce website, wherein the RTO plug-in is executable by the e-commerce server to:
integrate a RTO control element in the checkout interface of the e-commerce website, wherein the RTO control element is selectable to initiate the RTO transaction as a payment option for a good; and
after selection of the RTO control element, provide to the consumer device one or more than one RTO user interface received from the RTO management application, to facilitate completion of the RTO transaction through the e-commerce website;
a RTO system comprising the RTO management application, wherein the RTO management application provides a plurality of RTO user interfaces including the one or more than one RTO user interface; and
a cloud RTO system in electronic communication with the RTO system, wherein the cloud RTO system comprises a cloud RTO management application configured to also provide the plurality of RTO user interfaces including the one or more than one RTO user interface; and
wherein the RTO plug-in is further executable by the e-commerce server to:
after selection of the RTO control element, provide to the consumer device one or more than one RTO user interface received from the cloud RTO management application to facilitate completion of the RTO transaction through the e-commerce website.

15. A system, comprising:
an e-commerce platform, comprising:
an e-commerce computer configured for electronic communication, via a network, with a consumer device, and
a rent-to-own (RTO) system comprising a RTO management application, the e-commerce computer configured for electronic communication, via the network, with the RTO system; and
e-commerce software configured to provide to the consumer device, via the network, a plurality of e-commerce user interfaces, including an e-commerce user interface associated with a good, wherein the e-commerce user interface associated with the good includes information corresponding to the good; and
a RTO plug-in integrated with the e-commerce software to facilitate a RTO transaction through the plurality of e-commerce user interfaces of the e-commerce platform, wherein the RTO plug-in is executable by the e-commerce computer to:
integrate a RTO control element in the e-commerce user interface associated with the good, wherein the RTO control element is selectable to initiate the RTO transaction to acquire the good using the RTO transaction; and
after selection of the RTO control element, provide to the consumer device, via the network, one or more than one RTO user interface received from the RTO management application, to facilitate completion of the RTO transaction through the plurality of e-commerce user interfaces of the e-commerce platform,
wherein the RTO management application is configured to provide a plurality of RTO user interfaces including the one or more than one RTO user interface to the e-commerce software.

16. The system of claim 15,
wherein the RTO plug-in is executable by the e-commerce computer to:
provide to the consumer device, via the network, a RTO user interface received from the RTO management application, wherein the RTO user interface comprises:
RTO terms for the RTO transaction; and
at least one user interface element selectable to indicate electronic acceptance of the RTO terms.

17. The system of claim 16, wherein the e-commerce software is configured to:
after a selection of the at least one user interface element, provide to the consumer device, via the network, an e-commerce user interface that indicates the RTO transaction as complete.

18. The system of claim 15, wherein the RTO plug-in comprises a RTO plug-in customized for the e-commerce platform.

19. A system, comprising:
an e-commerce server including an e-commerce application that provides, via the network, an e-commerce web site to a consumer device, the e-commerce web site comprising a plurality of e-commerce user interfaces including an e-commerce user interface associated with a good, wherein the e-commerce user interface associated with the good includes information corresponding to the good, the e-commerce server further including a RTO plug-in integrated with the e-commerce application to facilitate a RTO transaction through the e-commerce website, the RTO plug-in executable by the e-commerce server to integrate a RTO control element in the e-commerce user interface associated with the good, wherein the RTO control element is selectable to acquire the good using the RTO transaction; and
a rent-to-own (RTO) system comprising a computer processor and a RTO management application, wherein the RTO management application is executable by the computer processor to:
communicate, via a network, with the e-commerce server; and
after selection of the RTO control element, send to the e-commerce server, via the RTO plug-in, a plurality of RTO user interfaces including one or more than one RTO user interface for provision to the consumer device, via the network, to facilitate completion of the RTO transaction through the e-commerce website.

20. The system of claim 19, wherein the RTO management application is further executable to:
send to the e-commerce server, via the RTO plug-in, a RTO user interface that comprises:
RTO terms for the RTO transaction; and
at least one user interface element selectable to indicate electronic acceptance of the RTO terms;
receive from the e-commerce server, via the RTO plug-in, an indication that the at least one user interface element has been selected; and
after the electronic acceptance of the RTO terms, purchase the good and arrange delivery of the good.

* * * * *